(12) United States Patent
Sundaresan et al.

(10) Patent No.: US 11,546,080 B2
(45) Date of Patent: Jan. 3, 2023

(54) SYSTEMS AND METHODS FOR DOCSIS PROFILE MANAGEMENT

(71) Applicant: CABLE TELEVISION LABORATORIES, INC, Louisville, CO (US)

(72) Inventors: Karthik Sundaresan, Boulder, CO (US); Gregory C. White, Louisville, CO (US); Jingjie Zhu, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 765 days.

(21) Appl. No.: 16/377,030

(22) Filed: Apr. 5, 2019

(65) Prior Publication Data

US 2019/0305876 A1 Oct. 3, 2019

Related U.S. Application Data

(63) Continuation-in-part of application No. 15/729,058, filed on Oct. 10, 2017, now Pat. No. 10,944,500.

(60) Provisional application No. 62/405,640, filed on Oct. 7, 2016, provisional application No. 62/653,002, filed on Apr. 5, 2018, provisional application No. 62/653,007, filed on Apr. 5, 2018, provisional application No. 62/653,585, filed on Apr. 6, 2018, (Continued)

(51) Int. Cl.
*H04L 1/00* (2006.01)
*H04L 43/08* (2022.01)
*H04L 43/045* (2022.01)
*H04L 27/26* (2006.01)
*G06F 16/13* (2019.01)
*H04L 5/00* (2006.01)
*H04B 1/38* (2015.01)

(52) U.S. Cl.
CPC ............ *H04L 1/0003* (2013.01); *G06F 16/13* (2019.01); *H04L 1/0009* (2013.01); *H04L 1/0019* (2013.01); *H04L 27/2601* (2013.01); *H04L 43/045* (2013.01); *H04L 43/08* (2013.01); *H04B 1/38* (2013.01); *H04L 5/001* (2013.01)

(58) Field of Classification Search
CPC ... H04L 1/0003; H04L 1/0009; H04L 1/0019; H04L 27/2601; H04L 43/045; H04L 43/08; H04L 5/001; G06F 16/13; H04B 1/38
USPC .......................................................... 370/252
See application file for complete search history.

(56) References Cited

U.S. PATENT DOCUMENTS

| | | | |
|---|---|---|---|
| 2005/0120105 A1* | 6/2005 | Popescu ............... | H04L 69/329 709/230 |
| 2015/0188668 A1* | 7/2015 | Al-banna ............... | H04L 5/023 370/208 |
| 2016/0353456 A1* | 12/2016 | Gilson ............... | H04W 72/085 |

* cited by examiner

*Primary Examiner* — Chi Tang P Cheng
(74) *Attorney, Agent, or Firm* — Armstrong Teasdale LLP

(57) ABSTRACT

A profile optimizing method is provided for a downstream channel transmission of active subcarriers to user devices. The method includes steps of receiving channel measurement data from each user device for each subcarrier, calculating a maximum bit-loading value for each user device per subcarrier, grouping the user devices into a plurality of clusters based on a proximity of the maximum bit-loading values of a first user device to those of a second user device within the particular cluster, assigning each user device within the particular cluster to a single cluster profile. A plurality of single cluster profiles for the plurality of clusters forms a set of cluster profiles. The method further includes steps of determining a channel capacity ratio for the set of (Continued)

cluster profiles, and combining at least two single profiles of the set of cluster profiles into a coalesced profile pair.

10 Claims, 16 Drawing Sheets

Related U.S. Application Data provisional application No. 62/671,504, filed on May 15, 2018.

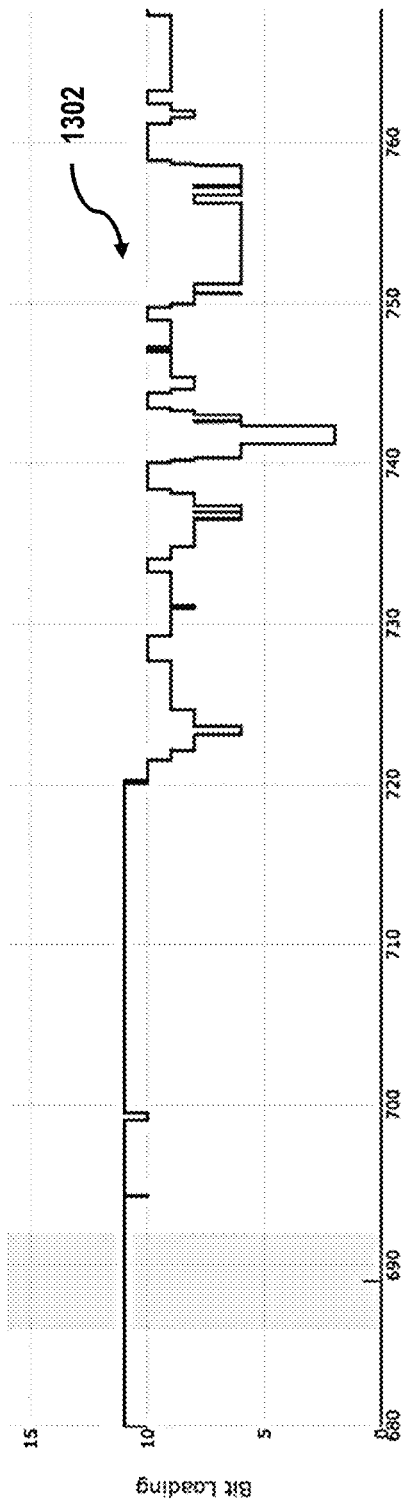
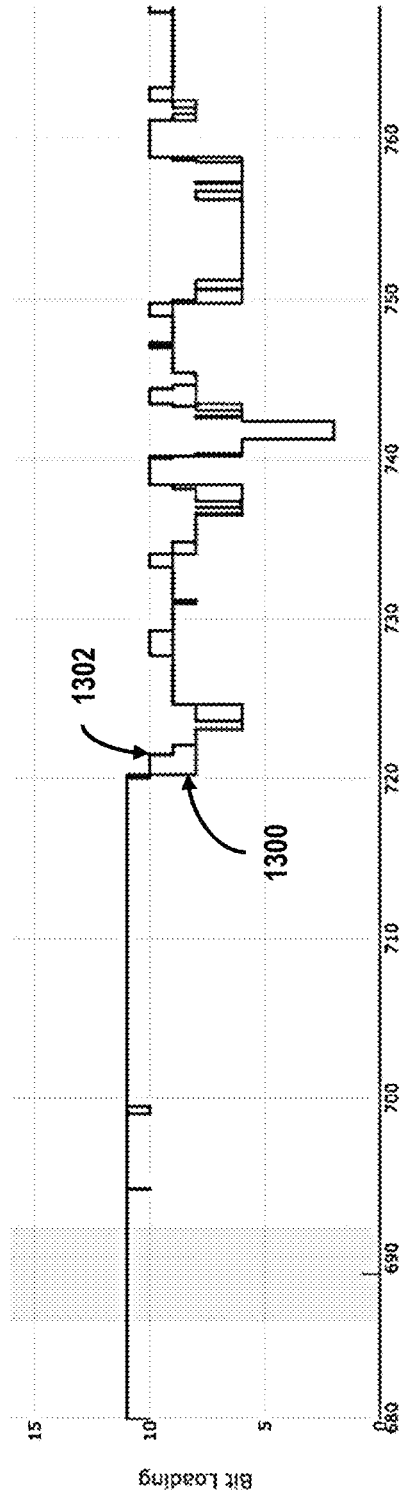
FIG. 13B
FIG. 13C

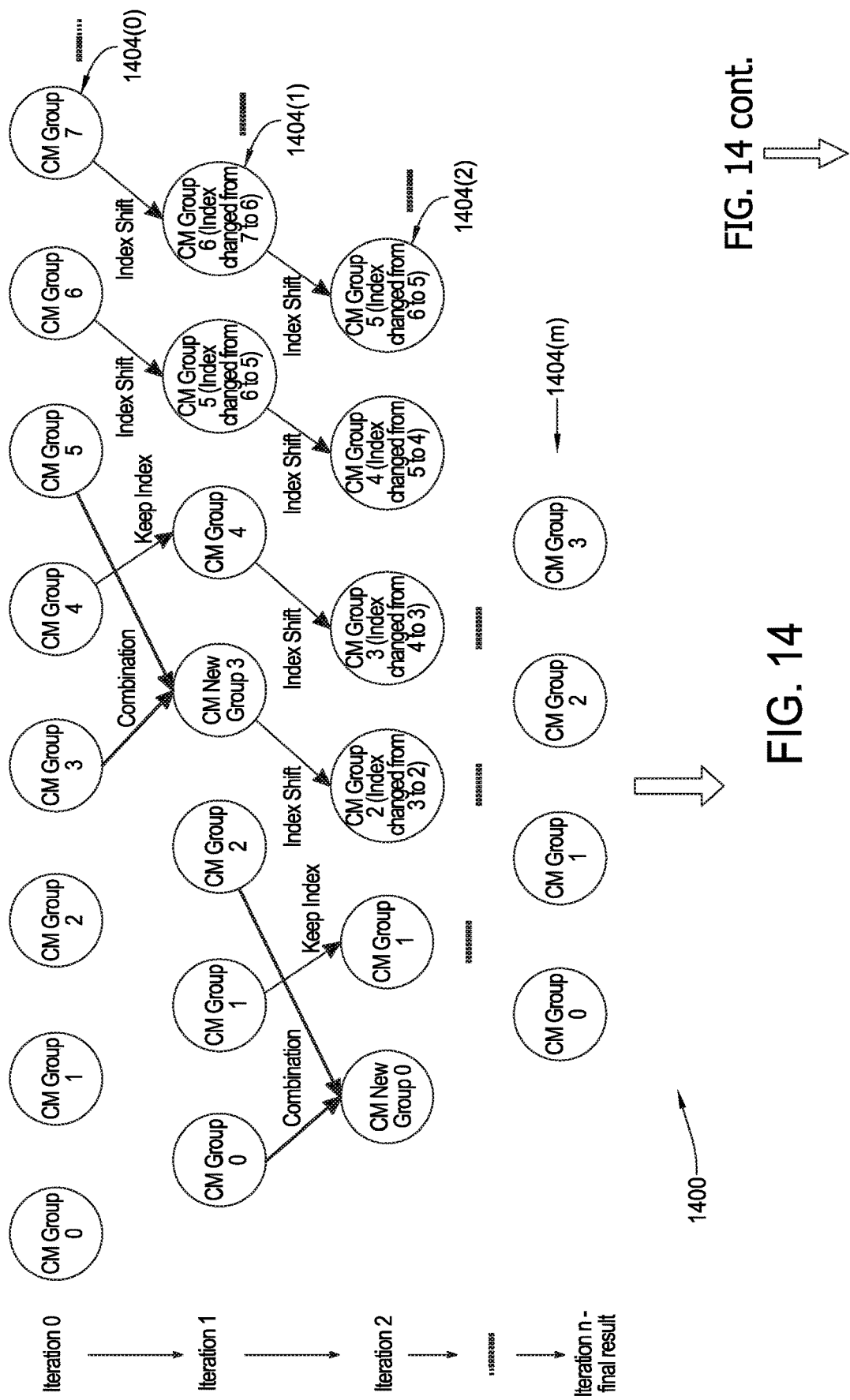

SYSTEMS AND METHODS FOR DOCSIS PROFILE MANAGEMENT

CROSS REFERENCE TO RELATED APPLICATIONS

This application is a continuation in part of U.S. application Ser. No. 15/729,058, filed Oct. 10, 2017, which prior application claims the benefit of and priority to U.S. Provisional Patent Application Ser. No. 62/405,640, filed Oct. 7, 2016. The present application further claims the benefit of and priority to U.S. Provisional Patent Application Ser. No. 62/653,002, filed Apr. 5, 2018, U.S. Provisional Patent Application Ser. No. 62/653,007, filed Apr. 5, 2018, U.S. Provisional Patent Application Ser. No. 62/653,585, filed Apr. 6, 2018, and U.S. Provisional Patent Application Ser. No. 62/671,504, filed May 15, 2018. The disclosures of all of these applications are herein incorporated by reference in their entireties.

BACKGROUND

The field of the disclosure relates generally to digital transmission systems, and more particularly, to multi-carrier wired, wireless, and optical digital transmission systems.

The Data Over Cable Service Interface Specification (DOCSIS), version 3.1 (DOCSIS 3.1, or D3.1) is one of many known communications standards. DOCSIS 3.1 has changed the nature of information delivery across cable plants in fundamental ways, as well as the hybrid fiber coaxial (HFC) networks that implement DOCSIS. In recent HFC developments, the downstream channel no longer employs a one-size-fits-all modulation scheme, and instead has begun to optimize the modulation and forward error correction based on actual plant conditions at individual devices. This more customized approach allows, on the same channel, devices that receive an exceptionally "clean" signal to utilize more efficient high-order-modulation, but devices that receive a degraded signal to utilize more robust modulation.

However, the newly increased capability in the downstream channel has created increased complexity to optimize performance of the network conditions, particularly with regard to (i) the design of orthogonal frequency-division multiplexing (OFDM) profiles that are transmitted on the downstream channel, and (ii) the selection of appropriate modulation orders for a particular profile.

BRIEF SUMMARY

In an embodiment, a method is provided for optimizing a set of profiles for a downstream transmission over a channel to a population of user devices. The downstream transmission includes a plurality of active subcarriers. The method includes steps of receiving channel measurement data from each user device of the population for each of the plurality of subcarriers, calculating, from the received channel measurement data, a maximum bit-loading value for each user device per active subcarrier, grouping individual ones of the user devices into a plurality of clusters based on a proximity of the maximum bit-loading values of a first user device within a particular cluster to the maximum bit-loading values of a second user device within the particular cluster, assigning each individual user device within the particular cluster to a single cluster profile. A plurality of single cluster profiles for the plurality of clusters forms a set of cluster profiles. The method further includes steps of determining a channel capacity ratio for the set of cluster profiles, and combining, based on the determined channel capacity ratios, at least two single profiles of the set of cluster profiles into a coalesced profile pair.

In an embodiment, a downstream transmission system is provided for transmitting a plurality of active subcarriers over a channel. The system includes a cable modem termination system configured to define a plurality of downstream profiles. Each of the plurality of downstream profiles includes a particular modulation order. The system further includes a plurality of cable modems in operable communication with the cable modem termination system, and a profile management unit configured to receive channel measurement data from each of the cable modems and select an optimized set of profiles from the plurality of downstream profiles based on the received channel measurement data.

In an embodiment, a non-transitory computer-readable storage medium is provided. The storage medium has computer-executable instructions embodied thereon. When executed by one or more processors, the computer-executable instructions cause the one or more processors to receive channel measurement data from a plurality of cable modems in operable communication with a cable modem termination system, cluster the received channel information into a plurality of subgroups of the plurality of cable modems, assign modulation profiles to each subgroup cluster, coalesce the assigned modulation profiles from at least two subgroup clusters into a single optimal coalesced profile applicable to all cable modems within the at least two subgroup clusters.

In an embodiment, a method is provided for optimizing a set of profiles assigned to a respective population of user devices configured to communicate over a network communication channel. The network communication channel includes a plurality of active subcarriers. The method is performed by a processor in communication with a memory, and includes a step of establishing a modulation error rate for each user device of the population of user devices. The method further includes a step of generating, in the memory, a memorization matrix for the population of user devices. The memorization matrix has an initial size of N×N, where N represents the number of user devices in the population of user devices. The method further includes a step of calculating, for each possible pairing of profiles in the set of profiles that are respectively assigned to two user devices, a capacity loss value resulting from the respective pairing. The method further includes steps of storing each calculated capacity loss value in the memorization matrix, and identifying a profile pair having a minimum capacity loss within the memorization matrix. The identified profile pair includes a first profile and a second profile. The method further includes a step of merging the user device associated with the second profile into the first profile to create a merged first profile. The method further includes a step of updating the memorization matrix to (i) replace the first profile with the merged first profile, (ii) remove stored values associated with the second profile, (iii) reduce a number of profiles in the set of profiles to form a reduced set having one fewer profile than the set of profiles, and (iv) reduce the size the memorization matrix to $(N-1) \times (N-1)$.

In an embodiment, a transmission system is provided for transmitting a plurality of active subcarriers over a channel. The plurality of active subcarriers includes a first profile having a first number of carrier subgroup segments corresponding to particular modulation order, respectively. The system includes a modem termination system configured to support a second number of modulation profiles fewer than the first number. The system further includes a plurality of modems in operable communication with the modem termination system. The system further includes a profile management unit configured to (i) identify all carrier subgroup segments in the first profile, (ii) calculate a capacity loss value for each possible pairing of a carrier subgroup segment with an immediately adjacent segment in the first profile, (iii) determine which adjacent segment pair has a minimum capacity loss among the possible carrier subgroup segment pairings in the first profile, (iv) merging the adjacent segment pair having the minimum capacity loss, (v) generating a second profile for the plurality of active subcarriers, wherein the second profile includes one fewer segment than the first profile

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

FIG. 13B is a graphical illustration of a lower resolution profile plot.

FIG. 13C is a graphical illustration superimposing the high resolution plot of FIG. 13A with the low resolution plot of FIG. 13B.

Figure 1:
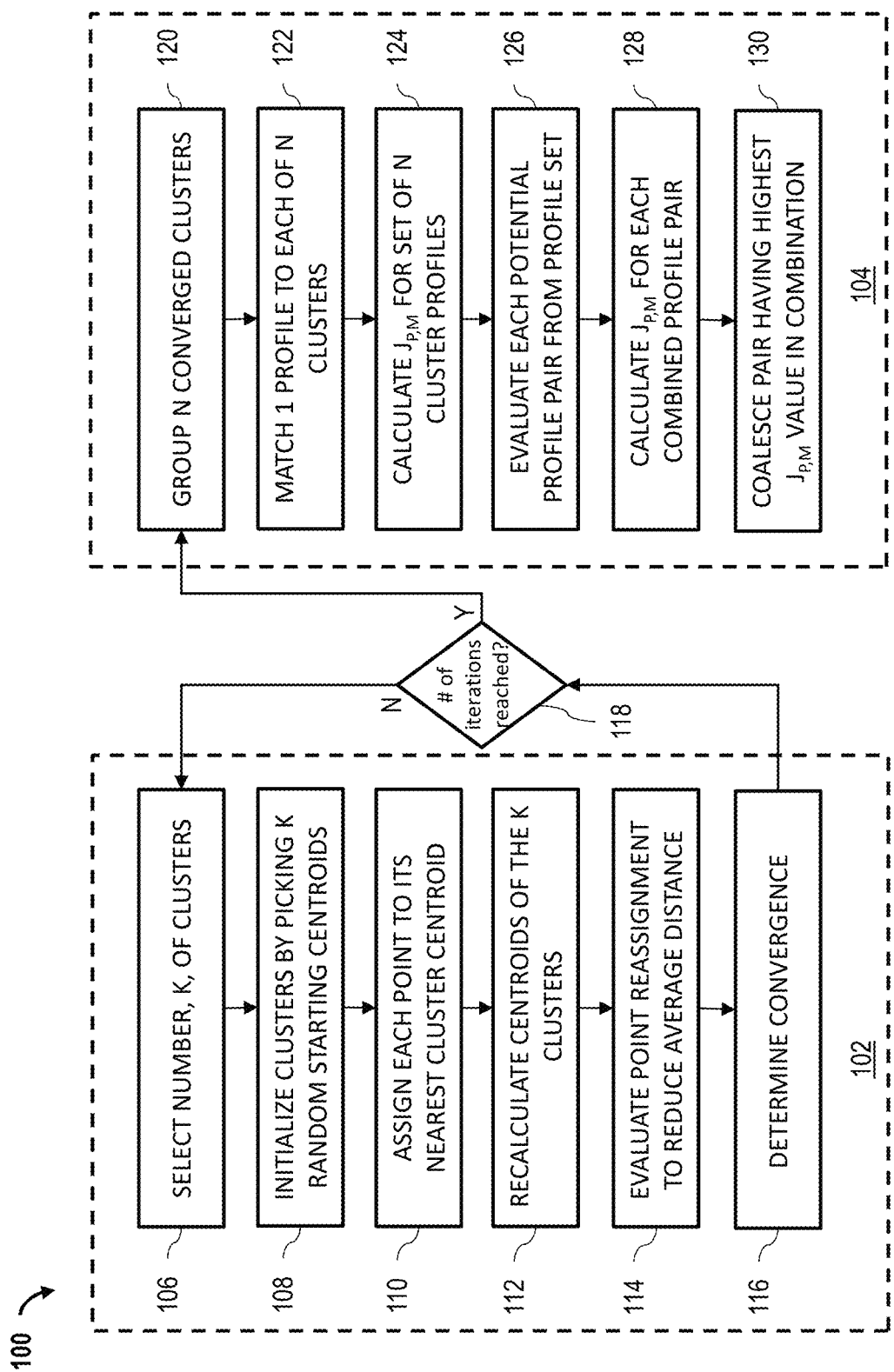
FIG. 1 is a flow chart diagram of an exemplary profile optimization process.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, unless specified to the contrary, "modem termination system," or "MTS'" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

In an exemplary embodiment, systems and methods are provided to optimize modulation profiles for individual end user devices, such as cable modems (CMs), or sets of CMs, and also to optimize grouping of CMs to select optimum modulation profiles thereof. DOCSIS 3.1 OFDM profiles include a wide range of modulation choices that maybe implemented to fine-tune a CM's transmission to achieve the best possible performance over given network conditions. The present embodiments therefore provide techniques to realize a well-designed and optimized set of modulation profiles. Systems and methods according to these techniques thereby advantageously allow a downstream channel to operate with a lower SNR margin, which in turn allows a particular channel to operate at an overall higher throughput.

The following embodiments describe novel systems and methods for designing OFDM profiles implemented with DOCSIS, and for selecting choosing the appropriate modulation orders for a particular profile. According to the present embodiments, a cable plant or transmission system may more efficiently and accurately determine which profile is appropriate for a particular CM, as well as what is the optimal set of profiles to utilize across an OFDM channel for a given set of CMs. the present techniques further define and objective function that may be used to calculate the gain in system capacity resulting from the use of multiple profiles, as well as advantageous approaches for maximizing this objective function for a population of CMs. In an exemplary embodiment, one such approach is described in detail further below, and sometimes referred to as a "K-means Coalescation Algorithm" (KCA). As described herein, the KCA provide significantly reliable results for determining the channel capacity/channel capacity ratio, and with low computational complexity.

The present embodiments advantageously utilize the range of modulation choices available in DOCSIS 3.1 to dynamically fine-tune transmissions to achieve optimal performance for given network conditions. The embodiments described herein further manage the optimization of settings across a population of devices utilizing downstream profiles. A given downstream profile defines the modulation order (i.e., bit loading) on each of a plurality of subcarriers (e.g., 3840 or 7680) across the particular OFDM channel. The present embodiments therefore advantageously utilize the capability of DOCSIS 3.1 to define multiple downstream profiles, in order to optimize, or "tune," each profile to account for specific plant conditions that are being experienced by a particular set of CMs.

In an exemplary embodiment, a software application is provided to implement optimization logic that, when executed by one or more processors of a device or transmission system, accomplishes the processes and subprocesses described further below. In some embodiments, the software application is stored and executed within a cable modem termination system (CMTS). In other embodiments, the application is external to the CMTS. When executed, the logic of the software application advantageously enables efficient utilization of profiles across channels and CMs. In some embodiments, the application is implemented by an operator, and allows uniform operation of algorithms across different CMTS platforms. As used further herein, the phrase "Profile Management Application" (PMA) refers to a software application, or a suite of software applications, installed on one or more processors, that is configured to execute any or all of the processes, subprocesses, methods, and/or algorithms described herein. Except where specifically described to the contrary, any portion of this functionality may be executed individually, separately, or in a different order from the other functionalities described herein.

The following embodiments are further described with respect to data elements utilized by the PMA, key information utilized by the PMA to make particular determinations, calculations, or decisions (e.g., channel configuration, profile test results, signal-to-noise ratio (SNR)/modulation error rate (MER) data for each CM, etc.), particular algorithms implemented by the PMA, and the overall structure of the PMA itself. The following embodiments further illustrate how the PMA selects an appropriate modulation order, or orders, for a profile, and how the PMA calculates which profile is appropriate/optimal for a CM, and/or how the PMA calculates the optimal set of profiles to use across the network.

DOCSIS Downstream OFDM Channels

A DOCSIS-configured CM typically supports two or more independently configurable OFDM channels, each occupying a spectrum of up to 192 MHz in the downstream. The maximum channel bandwidth of 192 MHz corresponds to 3841 subcarriers in 4K mode, and to 7681 subcarriers in 8K mode. A downstream OFDM signal typically includes data subcarriers, scattered pilots, continuous pilots, and PHY link channel (PLC) subcarriers. Thus, the spectrum encompassed (i.e., the active bandwidth of the channel) by a DOCSIS 3.1 downstream OFDM 192 MHz channel does not exceed 190 MHz. Accordingly, the number of contiguous active subcarriers in a downstream OFDM channel does not exceed 3800 for 4K fast Fourier transform (FFT), and does not exceed 7600 for 8K FFT. The two downstream channel types are summarized in Table 1.

TABLE 1

Downstream Channel Options

| | | |
|---|---|---|
| Subcarrier Spacing | 25 kHz | 50 KHz |
| Symbol Period | 40 µs | 20 µs |
| FFT Size | 8192 | 4096 |
| Maximum Number of subcarriers | 7600 | 3800 |

In operation, the downstream OFDM channel bandwidth may vary from 24 MHz to 192 MHz. Bandwidths smaller than 192 MHz are achieved by zero-valuing the subcarriers prior to performing an inverse discrete Fourier transform (IDFT), that is, by adjusting the equivalent number of active subcarriers while maintaining the same subcarrier spacing of 25 kHz or 50 kHz, as described in the DOCSIS 3.1 PHY Specification.

Downstream Modulation Profiles

Each of the subcarriers in the downstream OFDM channel may be configured to use a different modulation order, thereby allowing the CMTS to optimize the downstream transmissions across the frequency band (e.g., 192 MHz) of the channel. The specific choice of modulation order, selected for each subcarrier, is communicated to the CMs in the form of a modulation profile, which thus allows the CMs to interpret and demodulate the signal.

A typical DOCSIS modulation profile includes a vector of bit-loading values, that is, an integer value for each active subcarrier in the downstream channel. For modulation orders ranging from 16-QAM to 16384-QAM, the bit-loading values of the vector may then range from 4 to 14 (skipping 5). In practice though, it is expected that low bit-loading values (e.g., 7 or less) will be used infrequently since most plants support at least 256 QAM at present.

In an exemplary embodiment, the CMTS generates a "Profile A" for the CMs in a particular Service Group. Profile A then functions as the lowest common denominator profile, and may be successfully received by all CMs in the Service Group. The CMTS may then generate up to 15 additional modulation profiles, which may also be communicated to the Service Group. Each CM may then be assigned up to four modulation profiles, including Profile A (used for broadcast frames), an optimized profile for the CM's unicast traffic, and possibly two additional profiles that may be used for multicast traffic. In practice, since the number of CMs in a Service Group is expected to be greater than 15 (in a majority of cases), it is expected that each profile will be used by a group of CMs that have similar channel characteristics.

This capability of the system, to optimize the downstream transmission for the channel characteristics of the CM population, allows the present embodiments to achieve a significant improvement in channel capacity, while simultaneously improving RF plant maintenance. Before the advent of DOCSIS 3.1, all traffic had been transmitted (i) using the lowest common denominator modulation (e.g., 64-QAM or 256-QAM), (ii) setting the downstream channel capacity to a fixed value, and (iii) setting an MER target for plant maintenance. Under DOCSIS, however, only a fraction of the downstream traffic will be carried using the Profile A and, since the CMTS is capable of automatically determining the modulation to use for that profile, there is no longer a single MER target. Furthermore, since CMs may now be assigned to modulation profiles that are optimized for their channel conditions, there is also no longer a fixed value for channel capacity.

Accordingly, the cleaner the channel is with respect to a particular CM, the more efficient the CM's traffic becomes, thereby raising the overall average efficiency, and hence, capacity, of the channel. The present systems and methods advantageously capitalize on this capability by providing the CMTS the ability to determine the channel conditions for the set of CMs in the Service Group and, from the channel condition information, further determine an optimal set (up to 16 in general) of modulation profiles.

In the embodiments discussed herein, the present PMA implements one or more of several DOCSIS methods to determine the channel conditions in the DOCSIS network. Examples of such methods include, without limitation, the OFDM Downstream Profile Test Request/Response mechanism (OPT-REQ/OPT-RSP MAC Management Message exchanges), and the Proactive Network Maintenance (PNM) toolset. The consideration of these particular methods is described below.

OFDM Downstream Profile Test

In a DOCSIS 3.1 network, the CMTS is able to utilize MAC Management Messages, such as OPT-REQ, to request that a CM test various aspects of an OFDM downstream channel. In this example, the OPT-REQ message, sent to a CM, may be utilized to verify the CM's ability to receive a specified downstream OFDM profile, and/or to query the CM's receive MER (RxMER) statistics.

When requested to report its MER measurements, the CM includes the RxMER per Subcarrier in a return OPT-RSP message transmitted to the, which may be encoded as a packed sequence of 8-bit values for N consecutive subcarriers (N<7680), from lowest active subcarrier to the highest active subcarrier, including all the subcarriers in between. In an exemplary embodiment, although the resulting vector includes values for excluded subcarriers, the PMA is further configured to be able to ignore such included values based on the PMA's knowledge of excluded subcarriers.

Additionally, in some embodiments, a CM may, if desired, compare the RxMER per Subcarrier to a threshold value and report the result the comparison, calculate the number of subcarriers whose RxMER is a certain value below a target, and/or report the SNR margin of a candidate profile. That is, the present systems and methods utilize the ability of a CM to precompute some of the data before sending it back in a OPT-RSP message.

When requested to test a candidate profile, the CM may further report back the number of Codewords received during testing, such as Corrected Codeword Count (codewords that failed pre-decoding LDPC syndrome check and passed BCH decoding), and Uncorrectable Codeword Count (failed BCH decoding). The CM may still further report if the number of codeword failures was greater than a given threshold for the Candidate Profile.

Proactive Network Maintenance (PNM)

The CMTS and CM are also able to perform measurements and report network conditions as a part of supporting PNM functionality in the DOCSIS network. Such DOCSIS 3.1 downstream PNM measurements and data include, without limitation, Symbol Capture, Wideband Spectrum Analysis, Noise Power Ratio Measurement, Channel Estimate Coefficients, Constellation Display, Receive Modulation Error Ratio (RxMER) Per Subcarrier, FEC Statistics, Histogram, and Received Power. In this example, the DOCSIS 3.1 PNM capability assumes that a PNM server will initiate PNM tests and receive data output from the CM and/or from the converged cable access platform (CCAP). Some of the PNM data (e.g., RxMER numbers), are the same as that computed by a CM for the OPT-RSP message. All such PNM data may be uploaded to a PNM when requested by the PMA. Data obtained in this manner may be considered less timely comparison with data obtained using the OPT method.

The present embodiments primarily refer to the RxMER per Subcarrier data received from the CMs. The discussion of this particular received data is for simplicity of explanation purposes, and should not be construed as limiting. Other CM data, including the data discussed above, may also be utilized according to the principles described herein, and without departing from the scope of the several embodiments.

Profile Creation

For further simplicity of explanation, the following description assumes that a user's demand for bandwidth is independent of the modulation profile to which the user (i.e., the CM) is assigned. This assumption is reasonable with respect to the several embodiments, because the capability of a CM to use a particular profile is determined by the RF channel characteristics, which may be presumed to be independent of the user. The following description further assumes that in aggregate, the users assigned to each profile are generally equivalent in terms of bandwidth usage, and, as a result, each user is expected to place an equal load on the channel on average. This assumption is statistically borne out where all profiles contain a significant number of CMs. Nevertheless, the principles described herein are also useful in cases where CMs are not, in fact, substantially equivalent within a group. In such cases, the systems and methods described herein may further take into account considerations such as historical usage patterns, or weighting users based on the respective user service tiers. In light of the foregoing assumptions, the average channel capacity for a population of CMs, divided among a set of modulation profiles, may be derived.

For a population of user CMs, each user places data on the channel at a rate of b bits-per-second. Accordingly, each user profile will similarly place profile data on the channel at a rate of Nx*b bits-per-second, where Nx is the number of users assigned to profile x. This data rate thus equates to a symbol rate Sx namely, for the profile x, Sx=Nxb/Kx symbols-per-second, where Kx is the total efficiency of profile x (i.e., the sum of the bit-loading values of all of the subcarriers). The total channel symbol rate S is therefore the sum of the symbol rates Sx of all of the profiles. For purposes of this discussion, these calculations are simplified to disregard the forward error correction (FEC), as well as overhead incurred by the use of multiple profiles, such as additional NCP blocks, partial codewords. The total channel rate S may therefore be represented according to the following equations:

$$S = \sum_{\forall x} S_x \quad \text{(Eq. 1)}$$

$$S = b \cdot \sum_{\forall x} \frac{N_x}{K_x} \quad \text{(Eq. 2)}$$

Where b represents the per user bit rate for a fully loaded channel. Accordingly, since the symbol rate S of the channel is a parameter typically set by the operator (e.g., 50 ksym/s or 25 ksym/s), the per user bit rate b, for a fully loaded channel, may be derived according to the equation:

$$b = S \Big/ \sum_{\forall x} \frac{N_x}{K_x} \quad \text{(Eq. 3)}$$

Total channel capacity C is calculated as: C=N*b, where N is the total number of users expressed according to the following equation:

$$C = NS \Big/ \sum_{\forall x} \frac{N_x}{K_x} \quad \text{(Eq. 4)}$$

Or alternatively as:

$$C = S \Big/ \sum_{\forall x} \frac{\Phi_x}{K_x} \quad \text{(Eq. 4)}$$

Where $\Phi_x = N_x/N$ is the fraction of users assigned to profile x. Accordingly, the harmonic mean (across all CMs) of each CM's single-user channel capacity is thus calculated.

As described above, DOCSIS 3.1 includes the notion of a lowest-common-denominator profile, referred to as "Profile A" that can be utilized by all CMs in the service group. In practice, it is mandatory that a Profile A be created (e.g., for broadcast data, at a minimum), to provide a useful metric J to assess the utility of a set of candidate profiles P, where $J_{P,A}$ is the ratio of the channel capacity $C_P$ using the set of candidate profiles P to the channel capacity $C_A$ only using profile A.

This ratio metric J is represented according to the following equations:

$$J_{P,A} = C_P / C_A \quad \text{(Eq. 5)}$$

$$J_{P,A} = \frac{S \Big/ \sum_{\forall x} \frac{\Phi_x}{K_x}}{S \Big/ \frac{1}{K_A}} \quad \text{(Eq. 6)}$$

Where $K_A$ is the efficiency of Profile A. These equations may be further reduced to:

$$J_{P,A} = \frac{1}{K_A \cdot \sum_{\forall x \in P} \frac{\Phi_x}{K_x}} \quad \text{(Eq. 7)}$$

Accordingly, the following embodiments advantageously accomplish the objective to create profiles that select a particular set of profiles P that maximizes the metric $J_{P,A}$ for the Service Group.

Channel Conditions for the Service Group

The population CMs in the Service Group is represented as a number N, and therefore the present PMA is configured to generate an N-by-N_sc matrix M describing the bitloading capability of each CM, where N_sc represents the number of active subcarriers in the channel (e.g., up to 3800 for 4K FFT, and up to 7600 for 8K FFT). In an exemplary embodiment, the PMA generates this matrix by instructing the CMTS and/or CMs to perform channel measurements and report the MER per Subcarrier. From the reported MER information, the PMA is further configured to calculate the maximum bit-loading that the CM can reliably receive for each subcarrier. In some embodiments, the maximum bit-loading calculation further includes headroom to ensure reliable communication. In other embodiments, the maximum bit-loading calculation is aggressive, and relies on FEC to correct for MER deficiencies. In at least one embodiment, alternating subcarriers are assigned alternating bit-loading values, in order to target a CM that reports an MER that is halfway between the MER required for each of the two bit-loading values, and then also relies on FEC to further enable reliable communication.

From these PMA calculations, a "maximum-bit-loading" vector may be determined for each CM.

Calculating Profile A and $\Phi x$

For a given matrix M, Profile A may be determined from the column-wise minimum of matrix M (min(M)). Values $\Phi x$ are determined by comparing the rows of matrix M to the matrix of profiles P as follows.

In an exemplary embodiment, the PMA evaluates the suitability of a particular profile for a CM by comparing the maximum-bit-loading vector for the CM to the bit-loading vector of the profile P, and then determining that the CM vector is greater than the profile P vector for all subcarriers. In some embodiments, the relevant algorithm of the PMA accommodates the CM having some deficiencies in the number of subcarriers, based on a separate analysis of in FEC capability to correct for such deficiencies. In the exemplary embodiment, and for ease of further explanation, the PMA assigns each CM to the most efficient profile available, namely, the profile having the highest total bit-loading.

Using the matrix M, the ratio metric $J_{P,A}$ may be recast as the following objective function: $J_{P,M} = J_{P,A}$, where A=min (M) and $\Phi x$ is determined as described above. The PMA may therefore, under these considerations, address optimization as a determination of which profile P, for the matrix M, maximizes the value of the objective function ratio $J_{P,M}$. In the exemplary embodiment, because the matrix M is expected to vary over time (e.g., due to CMs being added to/removed from the Service Group, and/or due to fluctuations in channel conditions), the PMA periodically refreshes the measurements of matrix M, and updates the set of profiles P accordingly.

Profile Cost

As described above, for simplicity of description, the derivation of channel capacity C, and therefore also the objective function $J_{P,M}$, does not include additional overhead that would be incurred by introducing profiles to the profile set. The relevant "cost" of supporting each such additional profile results from events such as (i) the additional Next Codeword Pointer Data Message Blocks (necessary when the profile in use is changed within a symbol), (ii) the possibility of needing to pad a symbol with Zero Bit Loading, and (iii) the increased likelihood of using shortened FEC codewords.

Given that $J_{P,M}$ calculations described herein do not factor in the cost of supporting multiple profiles, it is demonstrable from the present embodiments that the optimal $J_{P,M}$ values increase as the number of profiles in P increases, at least until the number of profiles in P equals the number of unique vectors in matrix M (i.e., each CM having its own profile). Accordingly, the embodiments described herein are directed toward defining/selecting an optimal set of profiles from a target number of profiles, and therefore more closely reflect results from larger sets of such profiles. Nevertheless, utilizing the principles of the present embodiments, the profile cost may be additionally considered to determine the optimal number of profiles itself, as opposed to which set of a given number of profiles is optimal for assigning.

Multicast Profiles

As discussed above, some profiles may be used for multicast transmissions that need to be received by a known subset of CMs. In such cases, the CMTS may be configured to generate a multicast profile specifically to target the joiners of each multicast group. However, for a CMTS that only supports 16 total profiles, each of these multicast profiles will reduce the number of unicast profiles available, thereby reducing the total unicast channel capacity. For ease of explanation, the present embodiments are explained with respect to optimization of unicast profiles. A person of ordinary skill in the art though, after reading and comprehending the present disclosure, will understand that the present embodiments may be implemented to optimally define profiles in the presence of multicast groups.

Profile Optimization

In accordance with the several embodiments described herein, the PMA may implement one or more of the following methods, processes, subprocesses, and/or algorithms to select the optimal set of profiles.

Brute Force Searching

One such approach for selecting the optimal set of profiles is sometimes referred to as the "brute force search." The brute force search essentially includes steps of trying all combinations of all possible profiles, calculating the $J_{P,M}$ value for each such combination, and then selecting the profile combination exhibiting the highest $J_{P,M}$ value. In practice, however, the brute force approach requires vast amounts of processing and memory resources to execute. For example, a 192 MHz/4K FFT channel may include as many as 3800 subcarriers, with 10 choices of bit-loading for each subcarrier, resulting in at least $10^{3800}$ possible individual profiles, and approximately $$\binom{10^{3800}}{15}$$

possible 16-profile sets (approximately $10^{57,000}$) to evaluate. This computational resource problem increases exponentially for higher order channels, such as an 8K mode channel (with 7600 subcarriers), or greater.

Nevertheless, in the brute force approach, the required search space may be somewhat reduced by eliminating from consideration those profiles that have a lower bit-loading than Profile A. For example, in the case where the geometric mean of the subcarrier bit-loading values of Profile A is 8 (e.g., corresponding to 256-QAM), the search space (in the 4K case) may be reduced from approximately $10^{57,000}$ to about $7^{57,000}$ or $10^{48,000}$. However, despite this significant reduction, the remaining computational requirements are still well beyond computationally feasibility for typical transmission systems.

The brute force computational requirements may yet be further reduced in consideration that it is unlikely that subcarrier bit-loading would need to vary by more than one modulation order between adjacent subcarriers. The number of possible profile sets may then be further simplified to approximately $10^{27,000}$. At the sacrifice of optimality, an additional simplification will assume that bit-loading changes only every 2 MHz (e.g., for 40 subcarriers), and then by only one modulation order at most for each such change. Using this simplification, the number of possible profile sets is reduced to approximately $10^{700}$, which is a dramatic reduction, but still computationally infeasible for the typical present-day transmission system.

In modern transmission systems, using the brute force approach, it would take approximately 11 million operations to calculate $J_{P,M}$ for a 16-profile set on a 4K FFT channel having 200 CMs, whereas present-day top-and processors (e.g., Core i7) would not be able to evaluate more than 20,000 profile sets per second, or approximately $10^{10}$ profile sets per day. Thus, even as processing power and speed continues to improve, so does the complexity and volume of transmission data.

Grouping CMs

The present systems and methods advantageously avoid the computational feasibility difficulties described above with several optimization approaches. In one such approach, an optimal single profile for a group of CMs may be more easily determined by first finding the minimum bit-loading capability for each subcarrier across the group of CMs. In other words, the PMA obtains the column-wise minimum of a subgroup's bit-loading capability matrix, $M_1$, where the rows of $M_1$ represent the bit-loading capability vectors of the CMs in the subgroup. Accordingly, the determination of the optimal set of profiles for a population of CMs may be alternatively considered as a determination of the optimal groupings of CMs. The optimal grouping determination may be performed as a single process, or in several stages.

Profile Coalescation Algorithm (PCA)

One approach utilized by the PMA for grouping CMs utilizes a profile coalescation algorithm (PCA). In an exemplary embodiment, the PCA begins with one profile per CM, where each CM's profile exactly matches its bit-loading capability vector, resulting in a set of N profiles. This set of N profiles is optimal for the population of CMs; however, unless N is less than 16, the number of profiles will be more than the typical CMTS can support. After the set of N profiles is determined, the PCA calculates $J_{P,M}$ for the set.

In the exemplary embodiment, in order to reduce the number of profiles of the set and, the PCA generates an optimal set of N−1 profiles by combining two of the N profiles into a single profile. In at least one embodiment, the optimal value is found by evaluating the effect of combining each of the $$\binom{N}{2}$$

possible pairs or profiles (e.g., 19,900 pairs for a population of 200 CMs) and then, of these potential choices, coalescing the pair that provides the highest value of $J_{P,M}$.

In an exemplary embodiment, the PCA algorithm process can then be repeated to find the optimal set of N−2 profiles, then N−3, N−4, etc., until a desired number of profiles is achieved. By itself, the PCA may require a significant amount of processing (O(N²)) for large values of N. However, this processing load may be reduced by implementing the PCA as a second stage of a two-stage process that pre-identifies clusters of CMs, and then beginning the PCA processing stage using one profile per cluster, instead of one profile per CM.

K-Means Coalescation Algorithm (KCA)

FIG. 1 is a flow chart diagram of an exemplary profile optimization process 100. In an exemplary embodiment, process 100 is a two-stage process including a clustering subprocess 102 as the first stage, and a coalescation subprocess 104 as the second stage. As described further herein, process 100 is also referred to as the "K-Means Coalescation Algorithm," or KCA, which may be implemented by the PMA. As also described further herein, clustering subprocess 102 is referred to as the "K-Means Algorithm," or KMA, and coalescation subprocess 104 is referred to as the PCA, as described above.

In operation, process 100 begins within clustering subprocess 102, at step 106. In step 106, process 100 selects a value for K, representing the number of clusters (e.g., clusters 202, FIG. 2). In step 108, process 100 initializes clusters by selecting K random starting centroids (e.g., centroids 204, FIG. 2). In an exemplary operation of step 108, process 100 selects the starting centroids by randomly choosing K data points (e.g., data points 206, FIG. 2) from a set of data points. In step 110, subprocess 100 assigns every data point to its nearest cluster. In an exemplary operation of step 110, each data point is assigned to the centroid to which it is nearest on a graphical plot of data points (e.g., plot 200, FIG. 2). In step 112, after all data points have been assigned, process 100 recalculates the centroids for each of the K clusters. In an exemplary embodiment, steps 110 and 112 are collectively considered to constitute a batch update phase of subprocess 102, and the batch update phase is repeated until the average distance between data points and their respective centroids no longer changes.

Once the batch update phase is completed (i.e., no further changes in data point-centroid average distance) process 100 proceeds to step 114. In step 114, subprocess 100 evaluates each data point and calculates whether reassigning the particular data point to a different cluster will reduce the average point-centroid distance. In an exemplary operation of step 114, process 100 recalculates the centroids according to the potential data point reassignment. In a further exemplary operation of step 114, process 100 reassignment a data point to the cluster that results in the smallest average point-centroid distance for that particular data point, and may further recalculate the centroids after the particular point is reassigned. In exemplary embodiment, process 100 repeats step 114 until there are no more data point reassignments, and then proceeds to step 116, in which process 100 determines that the KMA has converged. In an exemplary embodiment, steps 114 and 116 are collectively considered to constitute in an online update phase of subprocess 102, which is performed after completion of the batch update phase.

Clustering and K-Means Algorithm (KMA)

Figure 2:
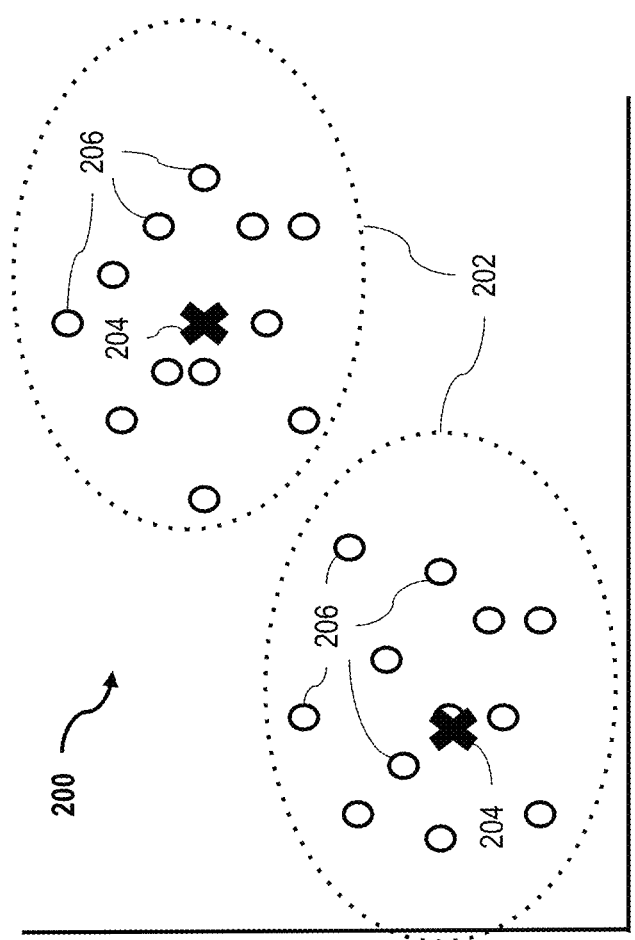
FIG. 2 is a graphical illustration of a plot of data point assignments according to the clustering subprocess depicted in FIG. 1.

FIG. 2 is a graphical illustration of a plot 200 of data point assignments according to clustering subprocess 102, FIG. 1. Plot 200 illustrates a graphical representation of a plurality of clusters 202 that each includes a centroid 204 and a plurality of data points 206. In the exemplary embodiment, plot 200 is obtained by implementing a clustering algorithm (e.g., subprocess 102, FIG. 1) for an unlabeled data set and identifying therefrom "clusters" of data/elements that are close to one another by some distance metric. In the exemplary embodiment, a KMA is used as the clustering algorithm.

In the example illustrated in FIG. 2, K=2, and the KMA separates the data points 206 into two clusters 202, with each data point 206 being assigned to the cluster 202 having a centroid 204 to which the particular data point 206 is nearest. In operation, the KMA takes the set of data points 206 and functions to identify the set of K clusters for which the average distance of each point 206 to a particular centroid 204 (i.e., the mean) of the associated cluster 202 is minimized. In the exemplary embodiment, the distance metric used by the KMA is an L1 or L2 norm, or the Mahalanobis distance. In some embodiments, the KMA implementation receives as input the number of clusters (K) into which the data set will be split, and then returns values for the set of K centroids, as well as a set of assignments of points to clusters. By itself, the KMA does not guarantee an optimal set of K clusters, and will in fact always converge to a local optimum. Nevertheless, the KMA is highly efficient, and may be repeated multiple times/iterations to select the best result therefrom.

In at least one embodiment, the KMA is utilized to identify groups of CMs that have similar bit-loading capability vectors since, in some instances, tightly clustered CMs may be considered good candidates to assign to a single profile. However, because the PMA is not, by itself, directed specifically toward the same objective of optimizing $J_{P,M}$, in the exemplary embodiment, the KCA does not automatically presume that the set of clusters 202 determined by the KMA is the optimal grouping of CMs with respect to the objective function $J_{P,M}$. Therefore, the KCA i.e., process 100, FIG. 1) advantageously utilizes the KMA as a pre-processing step (i.e., clustering subprocess 102) to the PCA (i.e., coalescation subprocess 104) in order to significantly reduce the number of starting profiles, and thereby also the computational complexity of the KCA.

Accordingly, referring back to FIG. 1, after process 100 determines, in step 116, that the KMA has converged, process 100 proceeds to step 118. Step 118 is a decision step. In step 118, process 100 determines whether subprocess 102 has been sufficiently repeated (e.g., subjected to a threshold number of predetermined iterations). If, in step 118, subprocess 102 has not been iterated the desired number of times, process 100 returns to step 106, and subprocess 102 is repeated. If though, in step 118, the sufficient iteration value has been reached, process 100 proceeds to step 120, which begins subprocess 104. The PCA of subprocess 104 therefore operates in a manner similar to the general PCA described above, except that, as a second stage of the two-stage KCA of process 100, the PCA of subprocess 104 advantageously begins with one profile for each cluster of CMs determined by subprocess 102, instead of a profile for each CM itself, thereby significantly reducing the processing requirements and computational complexity.

Referring back to step 120, subprocess 104 of process 100 begins by obtaining the group N of clusters determined according to the KMA of subprocess 102. Process 100 then proceeds to step 122, where the PCA determines, for each of the N clusters, a cluster profile that matches the bit-loading capability vector of that cluster, and thereby obtains a set of N cluster profiles therefrom. In step 124, process 100 calculates $J_{P,M}$ for the set of N cluster profiles. In step 126, process 100 evaluates the effect of combining each of the possible pairs of cluster profiles. In step 128, process 100 calculates $J_{P,M}$ for each pair of potentially-combined cluster profiles evaluated in step 126. In step 130, process 100 coalesces the combined cluster profile pair having the highest $J_{P,M}$ value from step 128, thereby reducing the set of N cluster profiles to a set of N−1 cluster profiles.

In an embodiment, to further reduce computational complexity, process 100 may repeat steps 126 through 130 in order to further reduce the set of N−1 cluster profiles to N−2, N−3, N−4, etc. cluster profiles as desired. According to the exemplary embodiment, clustering subprocess 102 thus functions as the first KMA pre-processing stage to the second-stage PCA of coalescation subprocess 104. In the exemplary operation, the KCA (i.e., process 100) is implemented as a combination of these two individual stages, but in the coordinated relationship described above. In one example of operation, the KMA/subprocess 102 is the run through a plurality of iterations (e.g., 30) with K=20, and a cluster assignment is selected that represents an optimal set of profiles, that is, as determined from the highest calculated values of $J_{P,M}$. The PCA/subprocess 104 then uses the set of profiles corresponding to this cluster assignment as the initial profile set for running the PCA. Through this advantageous integration of these two separate subprocesses, the present KCA achieves significant optimization improvements, and also significant reduction in computational complexity, then would be achieved from the mere combination of these two subprocesses operating independently, in a non-integrated manner.

Figure 3:
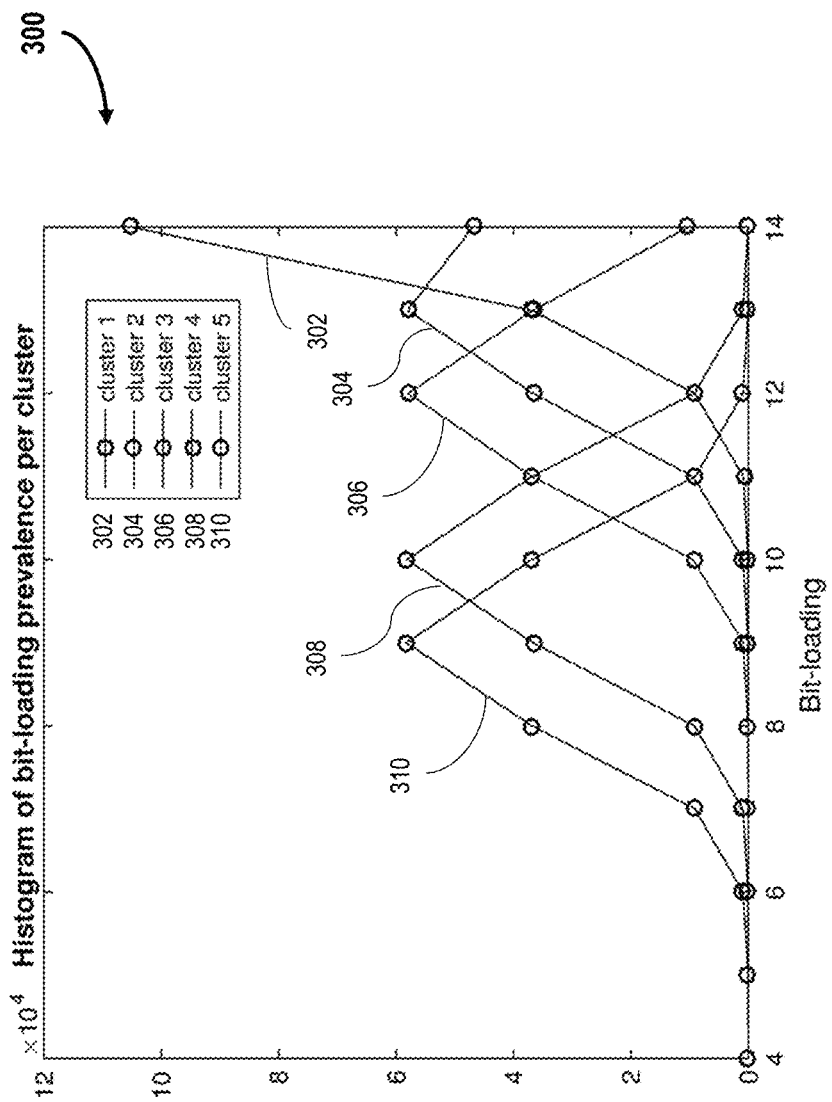
FIG. 3 is a graphical illustration of a histogram of bit-loading prevalence for a series of clusters according to the embodiment depicted in FIG. 2.

FIG. 3 is a graphical illustration of a histogram 300 of bit-loading prevalence for a series of clusters 202, FIG. 2. In an exemplary embodiment, histogram 300 is created from a synthetic CM data set of N=200 CMs, for a OFDM channel with N_sc=3800 subcarriers. In this example, an N-by-N_sc matrix M is generated to mathematically describe the bit-loading capabilities of each CM. The histogram results of the 200 synthetic CMs were divided into five clusters 302, 304, 306, 308, 310, with the CMs in each respective cluster having their bit-loading capability values chosen from a normal distribution with standard deviation of 1 and a mean unique to the cluster. The chosen bit-loading capability values were then quantized (i.e., rounded) to integers, and then limited to the range (4-14) of bit-loading values (x-axis). The mean values (i.e., the peak) for the five clusters were 14 (cluster 304), 13 (cluster 304), 12 (cluster 306), 10 (cluster 308), and 9 (cluster 310). The distribution of bit-loading values within each cluster are thus illustrated in the embodiment depicted in FIG. 3.

Figure 4:
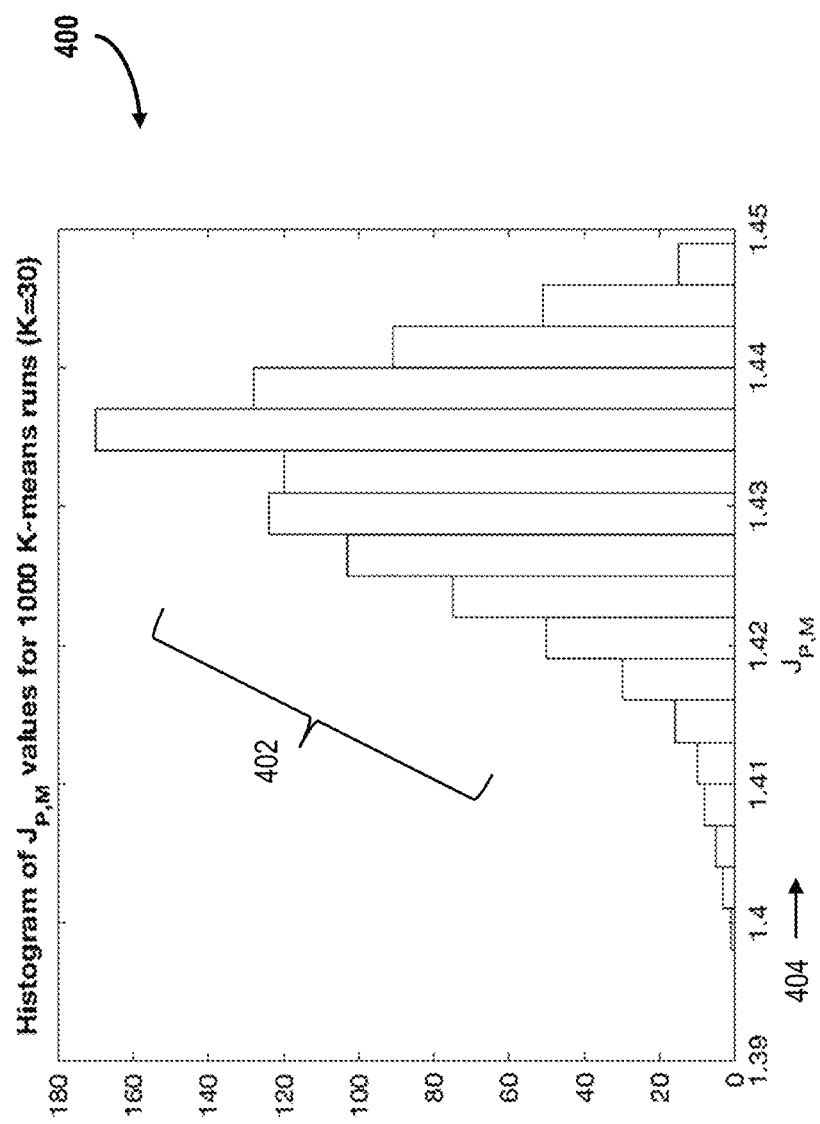
FIG. 4 is a graphical illustration of channel capacity ratio variability according to the clustering subprocess depicted in FIG. 1.

FIG. 4 is a graphical illustration of variability 402 of channel capacity ratio 404 (i.e., $J_{P,M}$, x-axis) calculated from the results of clustering subprocess 102, FIG. 1. In the exemplary embodiment shown in FIG. 4, the KMA begins with a randomized set of centroids (e.g. centroids 204, FIG. 2), and the resulting values will vary depending on particular starting conditions. In the exemplary embodiment, the KMA was run 1000 times (i.e., 1000 iterations of subprocess 102, FIG. 1), and the results thereof are plotted on histogram 400. The variability 402 in the results of running KMA only by itself indicates to the person of ordinary skill in the art that the KMA does not yield the same optimization results without further integration with the PCA.

Figure 5:
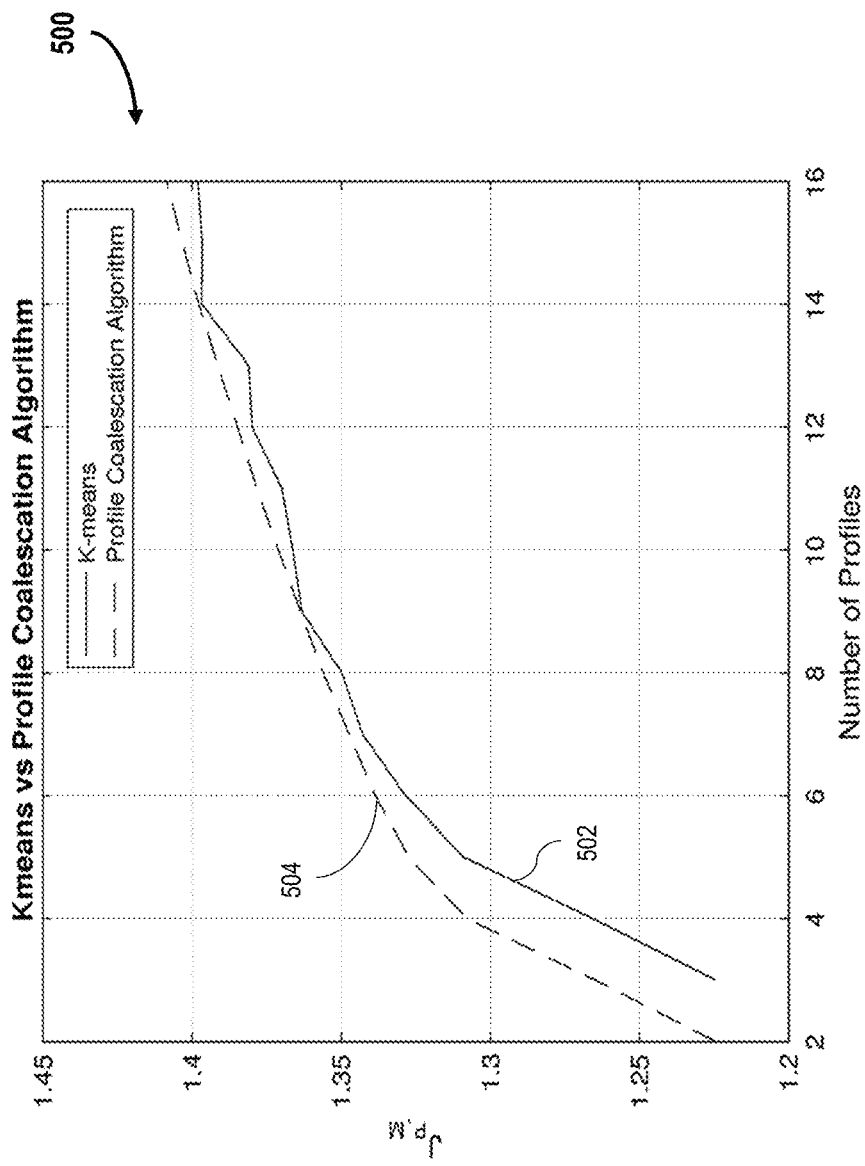
FIG. 5 is a graphical illustration plot comparing channel capacity ratio results between the subprocesses depicted in FIG. 1.

FIG. 5 is a graphical illustration plot 500 comparing channel capacity ratio $J_{P,M}$ results against the number of profiles for each of subprocesses 102, 104, FIG. 1, with both subprocesses operating independently to calculate values for $J_{P,M}$. As illustrated in FIG. 5, plot 500 includes linearized values 502 of KMA data collected using subprocess 102, linearized values 504 of PCA data collected using subprocess 104.

In an exemplary operation, for remaining profile generation algorithms, the KMA is run/iterated 30 times, and the best results are selected from these multiple iterations, as measured according to the highest values of $J_{P,M}$ from the 30 iterations. Accordingly, the two separate, linearized values for KMA results 502 and PCA results 504 are superimposed on one another, and thereby compared together. As illustrated, the PCA results 504 is shown to be more accurate, however, running the full PCA (i.e., subprocess 104, FIG. 1) on the modem population used in this experiment was very time-consuming, and therefore not extremely resource-efficient despite having achieved better results than using the KMA by itself.

Figure 6:
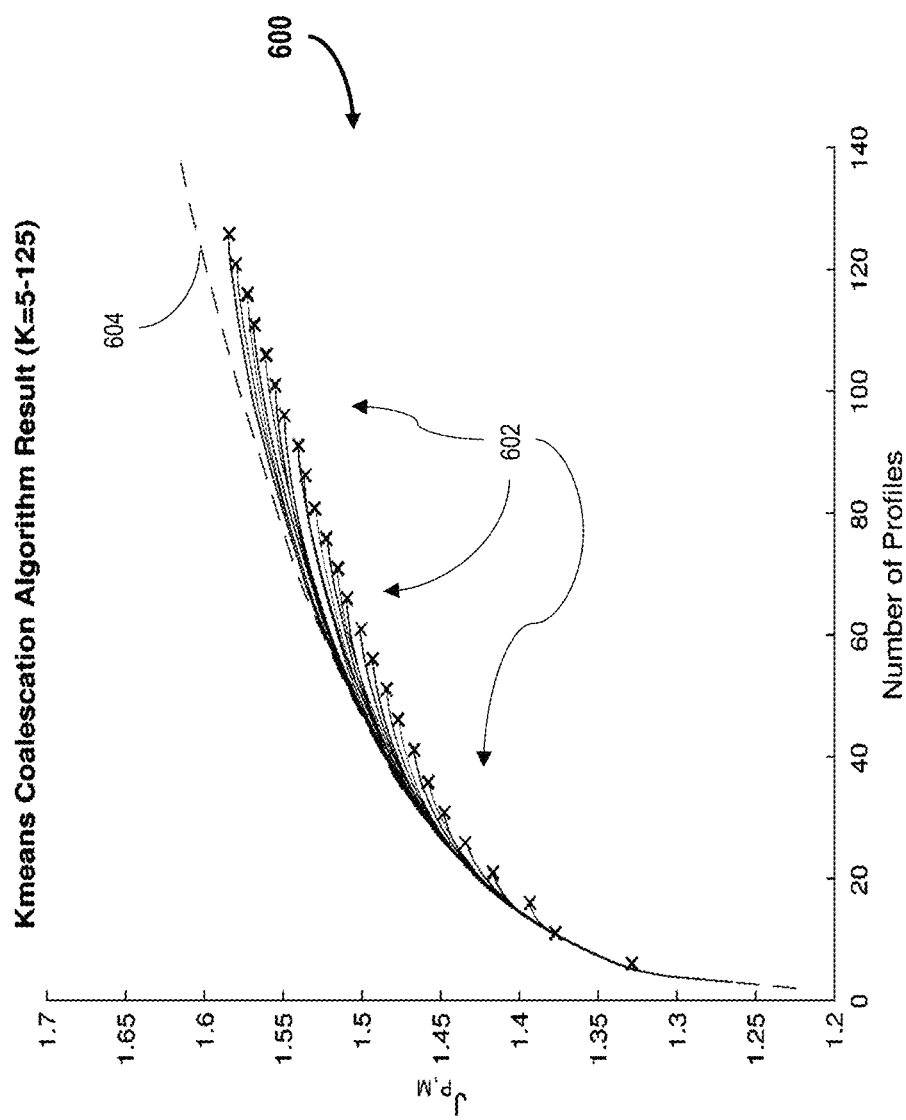
FIG. 6 is a graphical illustration plot of converging channel capacity ratio results according to the process depicted in FIG. 1.

FIG. 6 is a graphical illustration of a plot of converging channel capacity ratio results according to process 100, FIG. 1. In the exemplary embodiment, implementation of the full KCA process (i.e., process 100) yields results that cleanly converge to the PCA results of the particular CM population used as described above, as a test group. In this example, results of the KCA algorithm are illustrated using values of K ranging from 5 to 125, which are then compared against similar results 604 from the PCA (dashed line). In the illustration depicted in FIG. 6, particular $J_{P,M}$ values achieved by the KCA are marked with an individual to illustrate the $J_{P,M}$ value for a given number of profiles, and the solid line illustrates the progression of the coalescation algorithm.

Figure 7:
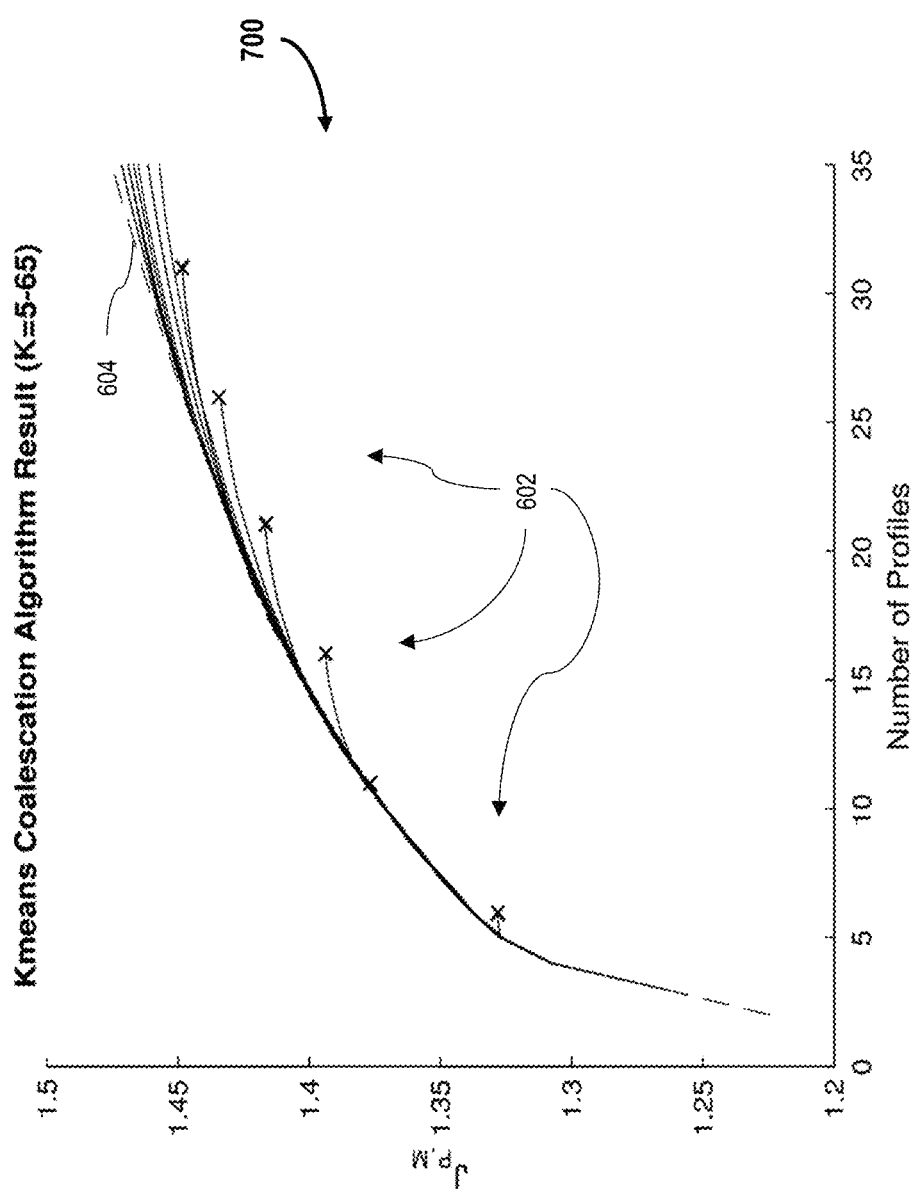
FIG. 7 is a close-up view of a region of the plot results depicted in FIG. 6.

FIG. 7 is a close-up view 700 of a region of the results depicted in plot 600 of FIG. 6. View 700 is similar to plot 600, except that view 700, interviews more closely, a region often considered to have the most interest, namely, where the number of profiles is less than or equal to 16. In this example, it can be seen that, by running the KCA with a K value of 20 (i.e., and thus 21 total starting profiles) the resulting $J_{P,M}$ values are substantially equivalent to the results 604 from the PCA (dashed line), and particularly with respect to substantially equivalent values from the PCA calculation within the 2-16 profile range, but with dramatically reduced computational complexity. This example, the benefit provided from utilization of 16 profiles may be quantifiably measured, namely, as 1.41, or also as 41% additional capacity transmission. Nevertheless, it should be noted that such results are strongly dependent on the CM population, and could be subsequently increased or decreased depending on how disparate the channel conditions might be across the CM population.

In the systems and methods described above, the embodiments described herein rely essentially on synthetic data sets. The present inventors contemplate that, by refining the KCA approach using real CM data, more practical and more robust CM data/profile optimization may be obtained.

As described above, DOCSIS 3.1 channel capacity is the harmonic mean of the individual CM single-user capacities. It is of significance to note that the harmonic mean is dominated by the minimum of the data. Accordingly, operators may expect that overall channel capacity using DOCSIS 3.1 is going to be strongly influenced by the worst performing of the CMs. Furthermore, with a profile management application in place, if the SNR for the worst performing CM degrades, the profiles can automatically adjust to maintain connectivity, eliminating any overt signal that the degradation has occurred. Unless the operator has systems in place to detect this condition, the operator may be disappointed by the performance of their DOCSIS 3.1 channels. Therefore, by monitoring the bit-loading of Profile A, and by identifying for remediation the CMs assigned to the Profile A, DOCSIS 3.1 plant maintenance may be further advantageously monitored and maintained.

The present inventors further envision advantageous uses for the present systems and methods including, but not limited to: (i) determining how often does a profile management application need to recalculate the profile definitions, (ii) determining how should a profile management application best handle sudden changes in the plant conditions, conditions which may make some profiles inappropriate for a set of CMs, and (iii) determining when it is appropriate to alert the operator to degraded CMs that are requiring an extremely inefficient profile. Such analyses, according to the present embodiments, will help an operator to develop a solid profile management application and help maintain an efficient and optimized plant.

The systems and methods described herein present a formulation to address some problems experienced with DOCSIS 3.1 downstream modulation profile optimization problem. The present embodiments thus demonstrate how the overall downstream capacity may be calculated as the harmonic mean of the individual CM. capacity can be calculated as the harmonic mean of the individual CM's single-user channel capacities (i.e., the capacity each CM would achieve if it were the only CM on the channel), and that the profile optimization problem is akin to a clustering problem, which may be solved according to similar processes and algorithms.

The KCA utilizes a KMA clustering algorithm to achieve improvements in both value and performance by successfully identifying optimal modulation profiles. In further embodiments, the KMA is integrated according to a novel PCA approach, which demonstrates improved performance over that of the KMA, but comes with significantly greater computational burden. Lastly, the KCA hybrid of the KMA and the PCA may provide equivalent results compared to the PCA by itself, but at significantly lower computational complexity.

Thus, a well-designed, optimized set of modulation profiles according to the present embodiments allows a downstream channel to operate with a lower SNR margin, potentially allowing a channel to operate at an overall higher throughput. Additionally, the optimized set of modulation profiles may further take into account troubled devices, by providing service even in situations where significant plant impairments exist.

Reducing Time Complexity for PCA and Brute Force Technique

As described above, optimization techniques for PMA include brute force searching techniques, and/or implementation of one or more innovative optimization algorithms such as PCA, KMA, and KCA. The PCA creates optimal profiles for a group of CMs by reducing the number of profiles iteratively. That is, as described above, the PCA determines the pair of profiles which, when merged, maximizes the resulting J-value, iteratively reducing the number of profiles until a desired number is reached.

However, although the PCA is the simplest to implement of the algorithms described above, the PCA may realizes a time complexity on the order of $O(n^3)$, which is not generally acceptable for real-world use. Furthermore, the PCA recalculates the overall J-value of all profiles in every iteration. The KMA and the KCA, on the other hand, generate profiles which may change randomly for each run. That is, even with the same data input, the results may differ when implementing the KMA or the KCA. The following disclosure thus describes improved techniques for enhancing the applicability of the PCA and brute force searching techniques, which dramatically reduce the time complexities thereof.

According to these improved techniques, a system operator may be capable of implementing the PCA and brute force searching techniques using existing, present-day equipment, and as a realistic alternative to implementation of the KMA or KCA, which operate significantly faster than the non-enhanced PCA.

In an exemplary embodiment, the PCA and brute force techniques are improved by: (i) calculating the capacity loss for merged pairs of groups instead of measuring the J-value of profiles at each iterative step (i.e., after the first iteration, only measuring the capacity loss for merged pairs in successive iterations); (ii) generating a memorization matrix to track previously-calculated capacity loss of mergers; and (iii) at each successive iteration, only recalculating the loss for each new, merged pair (i.e., one group in each pair will have changed). This improved PCA technique is thus capable of storing the unchanged group information within the memorization matrix, thereby dramatically reducing the calculation requirements of the processor by as much as an order of magnitude or greater. An exemplary optimization process is described below with respect to FIGS. 8 and 9.

Figure 8:
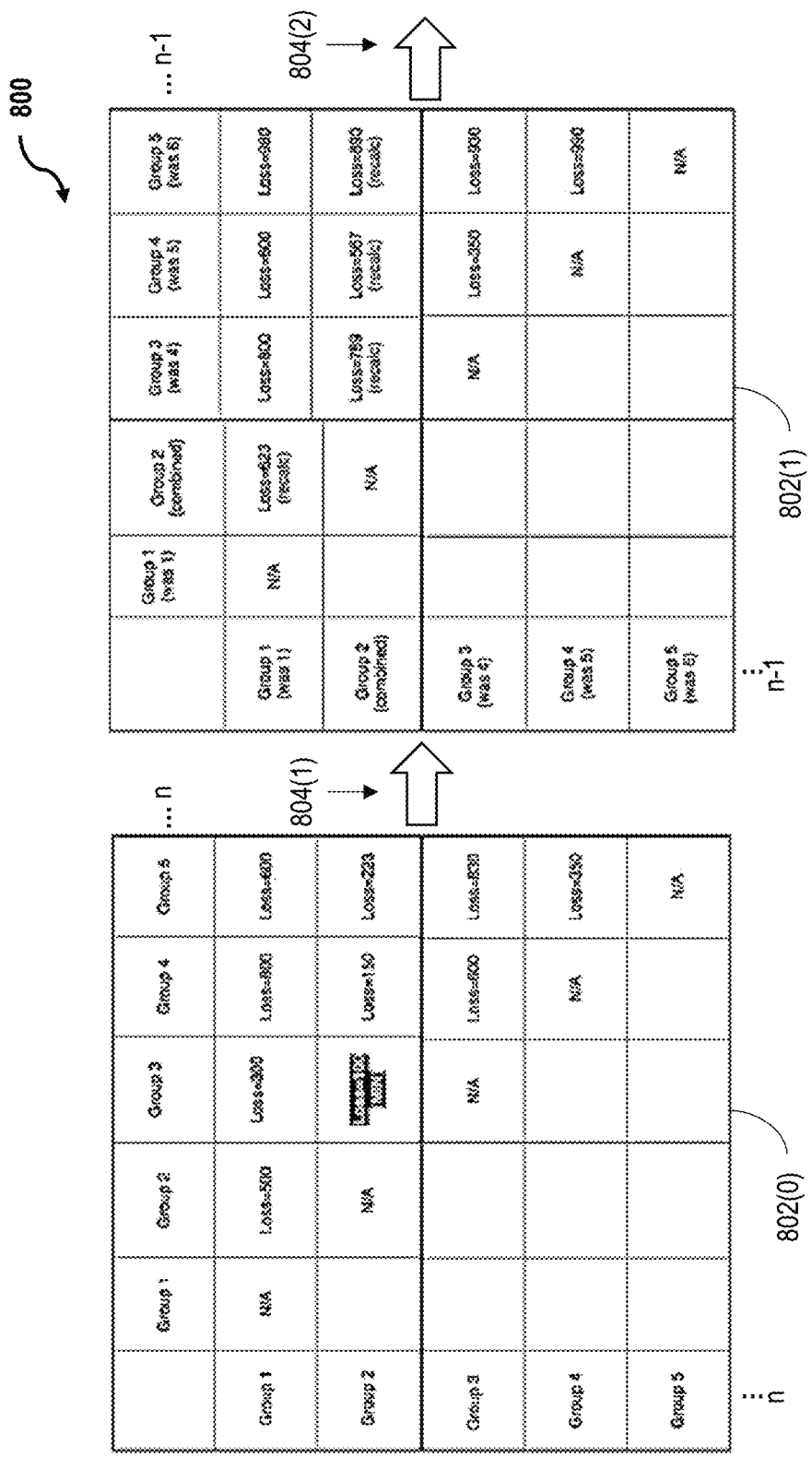
FIG. 8 illustrates an iterative memorization matrix sequence.

FIG. 8 illustrates an iterative memorization matrix sequence 800. In an exemplary embodiment, sequence 800 depicts a memorization matrix 802, initially of size N×N, which may be implemented, over a series of m iterations 804 to reduce the number of CM groups to a target number. In this example, initial memorization matrix 802(0) has a size N×N prior to first iteration 804(1). That is, memorization matrix 802(0) is generated for an original number of N CM groups.

Memorization matrix 802 stores the calculated results or measured loss from all combinations of two CMs or CM groups. That is, memorization matrix 802 stores the capacity loss values, CapacityLoss(A,B), for each combination of a CM group of profile A with a CM group of profile B. In an exemplary embodiment, the capacity loss values for all CM group combinations may be calculated according to:

$$\text{CapacityLoss}(A,B) = -((\text{num\_cm\_in\_group}\_A + \text{num\_cm\_in\_group}\_B)*\text{sum}(\text{LCDbitloading\_of\_both\_groups\_of\_CMs})) + (\text{num\_cm\_in\_group}\_A*\text{sum}(\text{LCD\_bitloading}\_A) + \text{num\_cm\_in\_group}\_B*\text{sum}(\text{LCD\_bitloading}\_B)) \quad \text{(Eq. 8)}$$

where num_cm_in_group_A represents the number of CMs in the group having profile A, num_cm_in_group_B represents the number of CMs in the group having profile B, LCD_bitloading_of_both_groups_of_CMs represents the least common denominator (LCD) of CM groups A and B, LCD_bitloading_A represents the LCD for the bit loading of group A, and LCD_bitloading_B represents the LCD for the bit loading of group B.

Once memorization matrix 802(0) is established, and the capacity loss is calculated and stored for each CM Group pair (A, B), the minimum capacity loss may be determined. In the example depicted in FIG. 8, the minimum capacity loss for memorization matrix 802(0) occurs at CM Group pair $(2, 3)_0$. Accordingly, at first iteration 804(1), original CM Group $2_0$ and CM Group $3_0$ are combined to form a new CM Group $2_1$ in memorization matrix 802(1), which further removes the column and row data from original CM Group $3_0$, recalculates the capacity loss for new combined CM Group $2_1$, and indexes the column and row data for all CM Groups of memorization matrix 802(0) affected by the removal of CM Group $3_0$. That is, in this example, CM Group $4_0$ in memorization matrix 802(0) becomes CM Group $3_1$ in memorization matrix 802(1) after iteration 804(1).

Accordingly, the J-values for each pair in memorization matrix 802(1) need only be recalculated for the new combined CM Group $2_1$, whereas all other J-values may be maintained from memorization matrix 802(0) as previously calculated (e.g., CM Group 1), or by merely indexing the respective CM Group number while maintaining its previously calculated values. Through implementation of memorization matrix sequence 800, the amount of recalculation required for each iteration 804 is significantly reduced, whether using the PCA or the brute force search technique, to only pairings with the CM group changed (i.e., by combination) in that iteration.

In an exemplary embodiment, a processor may execute instructions to create and maintain memorization matrix 802 according to sequence 800, such as according to the following exemplary PMA pseudocode:

```
INIT: Calculate CM profiles based on CM MER values
INIT: Create a memorization mMatrix N x N (N = numCMs)
INIT: I=-1
while number of profiles > target number of profiles
    for each pair of profiles (a, b) in the set of All unique combination
    of profiles
        do
            if Index(a) or Index(b) == I do
                Calculate C(a, b) = capacity_loss(a, b)
                Store C(a, b) to mMatrix(Index(a), Index(b))
        end for
    Find the pair A, B with minimum capacity loss
    Merge CMs in A and B to a new profile A'
    Remove all results stored in mMatrix related to B
    Assign the index of A' to I
Calculate J value for the resulting profiles
```

In an exemplary operation of the foregoing pseudocode, memorization matrix 802(0) is initially created as an N×N matrix for N CMs. At iteration 804(1), the pseudocode may be configured to (i) determines that the combination of CM Group $2_0$ and CM Group $3_0$ provides the minimum capacity loss, (ii) combine these two CM groups into a new CM group (i.e., CM Group $2_1$), (iii) update Group 2 accordingly (i.e., in memorization matrix 802(1)), (iv) remove Group $3_0$ from memorization matrix, (v) shifts all group after Group $3_0$ by 1, and (vi) recalculate the combination loss of new Group $2_1$ with all other CM groups. The process of this pseudocode may then be repeated for sequential iterations to maintain matrix 802 until the target number of CM groups is reached. The lowest common denominator (LCD) bit loadings of each CM group may represent the profiles for the respective CM groups. Thus, when there is a change to any group of CMs in the matrix (e.g., by combination), only the combination loss of that new CM group needs to be recalculated with other CM groups. Otherwise, all other combinations in the matrix may use previously calculated results.

According to the embodiment depicted in FIG. 8, the time complexity of the PCA and brute force techniques is reduced from $O(n^3*d)$ to $O(n^2*d)$, where n represents the number of CMs and d represents the number of subcarriers. Employing these principles, the present inventors have realized a reduction in calculation time by over 100 times for a practical implementation of 200 CMs. In some practical implementations, the present inventors have realized a reduction in calculation time from 100 seconds (i.e., without application of the principles according to this embodiment) to 30 ms. Additionally, implementation of these improved algorithm techniques advantageously remove random factors from the K-Means, thereby enabling more consistent calculation results on the same input data.

Figure 9:
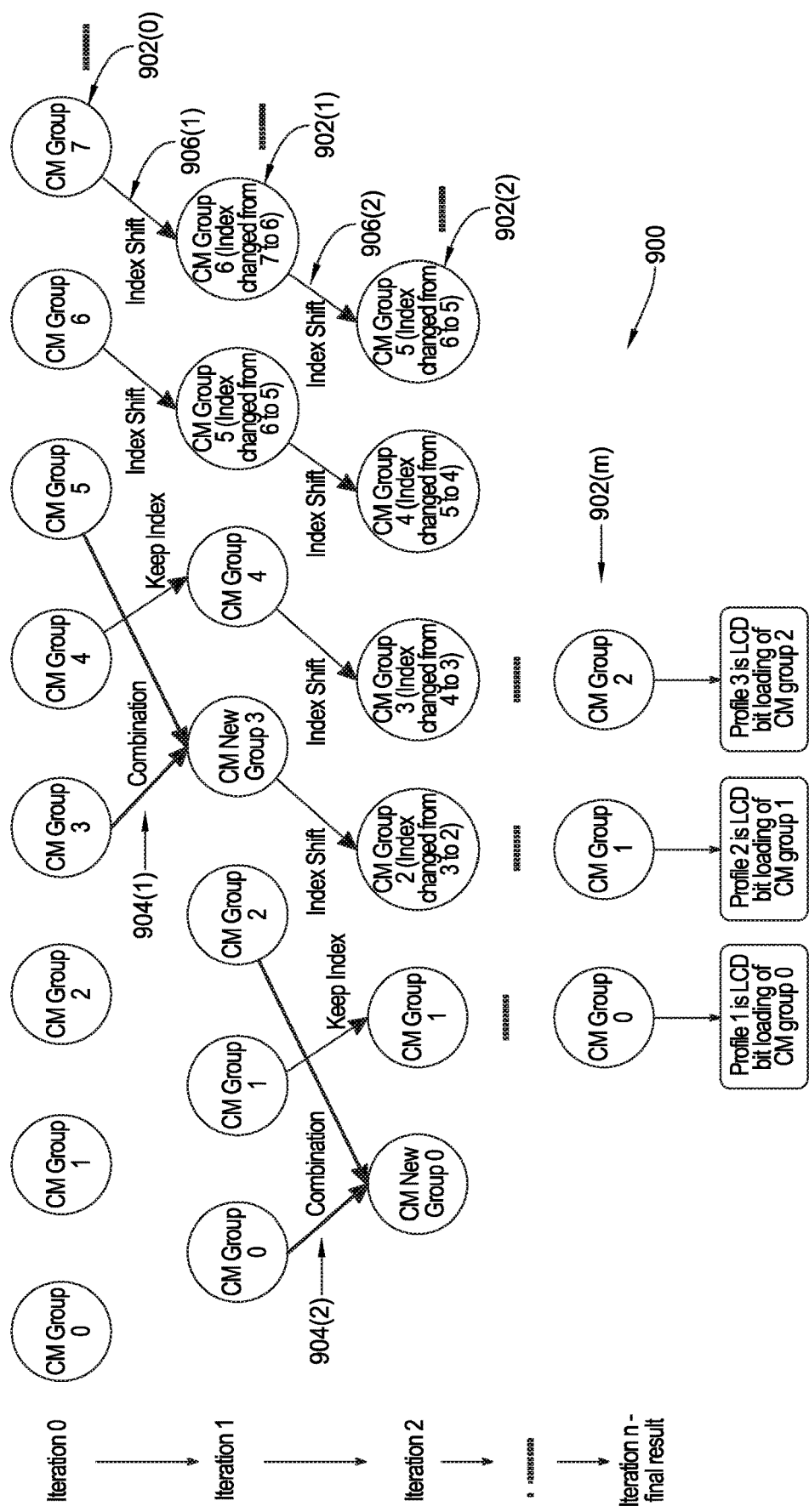
FIG. 9 illustrates an exemplary group iteration visualization.

FIG. 9 illustrates an exemplary group iteration visualization 900. In the exemplary embodiment depicted in FIG. 9, visualization 900 implements a PCA/brute force reduction process using a memorization matrix similar to the embodiments described above with respect to FIG. 8. More particularly, visualization 900 depicts a set 902 of CM Groups for a sequential series of iterations. Similar to the embodiment depicted in FIG. 8, in each iteration, a combination operation 904 is performed such that the two CM Groups calculated to have the minimum capacity loss of set 902 are combined into a CM Group pair (A, B) that becomes a new CM Group in the next iteration. CM Groups that are affected by the removal of CM Group B are then indexed by a related index operation 906 to update the number of the CM Group without having to recalculate the values thereof.

More specifically, in the example depicted in FIG. 9, in Iteration 0, CM Group pair (3, 5) is illustrated to demonstrate the minimum capacity loss of set 902(0), and therefore combination operation 904(1) functions to convert CM Group pair (3, 5) into the new CM Group 3 for Iteration 1. In conjunction with combination operation 904(1), visualization 900 further depicts index operation 904(1) functioning to remove the original CM Group 5 and update the CM Group number of all CM Groups from CM Group 6 and higher. In this example, it may be seen that the CM Group number of CM Groups 0, 1, 2, and 4 are not affected by index operation 906(1).

Further to the example depicted in FIG. 9, in Iteration 1, CM Group pair (0, 2) is illustrated to demonstrate the minimum capacity loss of set 902(1), and therefore combination operation 904(2) functions to convert CM Group pair (0, 2) into the new CM Group 0 for Iteration 2. Accordingly, index operation 904(2) removes CM Group 2, updates the CM Group number of all CM Groups from CM Group 3 and higher. The CM Group number of CM Group 1 is not affected by index operation 906(2). The overall process, including the individual iterations, combination operations 904, and indexing operations 906, is repeated until the target number of CM Groups is achieved in set 902(m) over m iterations. Accordingly, the respective profile of each CM Group in final set 902(m) represents the LCD bit loading of that CM Group. Thus, visualization 900 confirms another aspect of the optimization principles described above with respect to FIG. 8.

Efficient Generation of Effective Lower Resolution Profiles

Particularly within the paradigm of D3.1 and D3.1 profiles, a new problem has arisen due to many existing MTS implementations do not support higher resolution profiles that achieve the significant J-percentage capacity gains described above. Accordingly, there is a need to create practical lower resolution profiles when the number of modulation order changes/segments in a profile (or subcarrier bit-loading vector) is limited by the MTS implementation, but without significantly sacrificing the capacity gain of the higher resolution profile.

D3.1 OFDM/OFDMA modulation profiles are defined herein as a list of modulation orders per subcarrier in which the number of modulation order changes is unlimited. However, many CMTS implementations offered by present-day vendors and network operators support only limited numbers of modulation order changes (i.e., profile segments) per subcarrier within a profile. Thus, despite the theoretical superiority of unlimited modulation order changes, it is economically preferable for some operators to limit the number of supported profiles. Accordingly, when implementing PMA at scale, there is a need to reduce profile complexity to support these more limited MTS implementations, but without losing significant capacity.

The PMA algorithms described herein enable the calculation of optimal profiles able to change modulation orders from subcarrier to subcarrier. The following embodiments describe systems and methods capable of transforming the optimal profile to meet MTS implementations that limit the number of modulation changes.

In an exemplary embodiment, the present systems and methods efficiently create a low resolution profile from the optimal high resolution profile, where the low resolution profile is configured to include a maximum target number of modulation order changes/segments. In some embodiments, the created low resolution profile is capable of quickly calculating a target number of OFDM/OFDMA modulation profile segments from the original high resolution profile, which is per sub-carrier based, and which has an unlimited number of bit-loading changes. These resolution-reduction techniques thereby further advantageously minimization of channel capacity loss in cases where it is necessary or desirable to decrease the resolution of the profile. In other words, the present embodiments enable the conversion of ideal profiles into deployable, real-world profile definitions.

Figure 10:
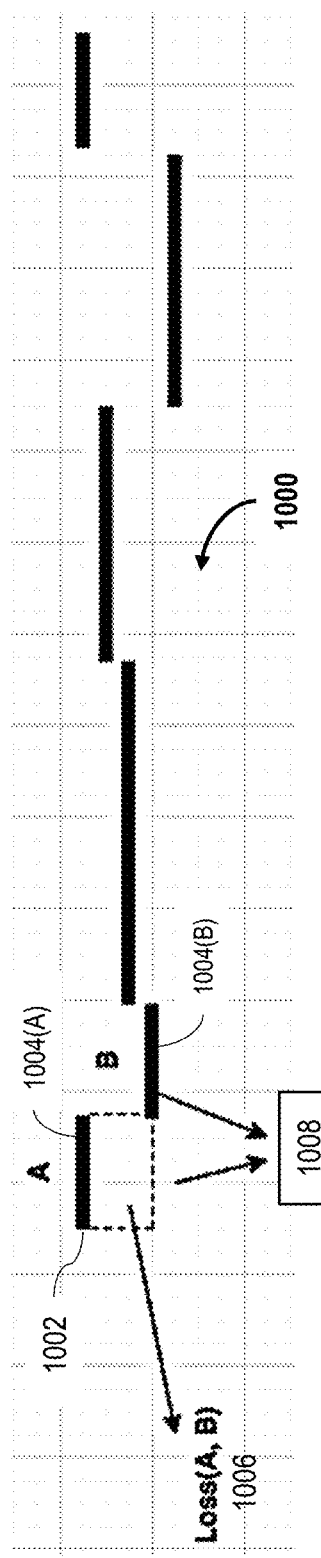
FIG. 10 illustrates an exemplary segmentation process for a profile.

FIG. 10 illustrates an exemplary segmentation reduction process 1000 for a profile 1002. In an exemplary embodiment, profile 1002 represents a high resolution D3.1 OFDM/OFDMA profile having a plurality of adjacent profile segments 1004. Process 1000 functions to effectively reduce the number of profile segments 1004 to a target number of segments by calculating the capacity loss resulting from the merger (that is, the combination) of adjacent segments 1004. In some embodiments, operation of process 1000 to merge segments 1004 within a single profile 1002 is functionally similar to the processes described above for combining CM groups within a set of CM profiles.

That is, in an exemplary embodiment, the capacity loss of every pair of adjacent profile segments 1004 is stored in a memorization list, which may be functionally similar to the memorization matrix described above with respect to FIG. 8, in order to reduce the amount of repetitive computation of profile segments. The memorization list (not shown in FIG. 10) may be configured to calculate a capacity loss value 1006 for the merger of two adjacent segments 1004 into a combined segment 1008 according to:

$$\text{Loss}(A,B) = \text{num\_subcarriers}\_A * \text{bitloading}\_A + \text{num\_subcarriers}\_B * \text{bitloading}\_B * (\text{num\_subcarriers}\_B + \text{num\_subcarriers}\_B) * \min(\text{bitloading}\_A, \text{bitloading}\_B) \quad \text{(Eq. 9)}$$

Accordingly, in the embodiment depicted in FIG. 10, the adjacent pair of segments 1004 having minimum capacity loss for the merger thereof (i.e., adjacent pair (A, B), in this example) may be selected for combination/merger, which thereby creates new merged profile segment 1008 (e.g., segment 1004(A+B)). After the merger operation of segmentation reduction process 1000, the effective number of segments 1004 is reduced by one, and process 1000 may be then repeated until the target number of segments is achieved.

Therefore, similar to the profile reduction processes described above, the loss resulting from all combinations of adjacent segments 1004 may be calculated in the first iteration of process 1000. In subsequent iterations/repetitions of process 1000, only the loss resulting from the merger of new combined segment 1008 with its adjacent segments (i.e., on the "left" and "right" in the example depicted in FIG. 10) needs to be recalculated for the reduced number of segments, thereby significantly reducing the computational complexity segmentation reduction within a single profile 1002.

In an exemplary embodiment, a processor may execute instructions to create, update, and reduce segmentation of the memorization list, such as according to the following exemplary PMA pseudocode:

```
INIT: Calculate OFDM/OFDMA profile definitions based on a selected PMA
        algorithm
INIT: Identify all existing segments/modulation order changes in the profile from
        low frequency to high frequency, append each of the {starting index, ending
        index, bit-loading value} as one element to SEG_LIST. {A segment is defined
        as the set of all continuous sub-carriers that have the same modulation
        order.}
INIT: Create a memorization data structure MEM. {For example, in C++ a multiset
        may be used to maintain a sorted element order and minimize the element-
        wise insertion time complexity (O(log(n))) at the same time.}
for each pair of adjacent segments (A(n), A(n + 1)) in the set of All adjacent
        segments do
        Calculate C(A(n), A(n + 1)) = capacity_loss(A(n), A(n + 1))
        Store   the set of values:{Index(A(n)), bitloadingAfterMerge (which is
                min(A(n), A(n + 1))), combinedLength, capacityLoss} as one element
                to MEM
end for
while number of segments > target number of segments, do
        *Sort  MEM by capacity loss in ascending order {the order may be
                automatically maintained when using data structures like the
                multiset in C++}
        Find the pair (A(n), A(n + 1)) in MEM with minimum capacity loss
        Combine segments A(n) and A(n + 1) and overwrite combined segment to
                A(n) into SEG_LIST
        Remove A(n + 1) from SEG_LIST
        Remove the last element (pair with minimum capacity loss) from MEM
        Subtract indexes of all pairs by 1 in MEM if respective index indicator is
                larger than index of A(n + 1), remove all results stored in MEM
        related to A(n + 1)
        Recalculate the capacity loss and segment information of the current
                combined segment A(n) when pairing combined segment with the
                current segment A(n − 1) and the current segment A(n + 1), if any
        Store the calculation result from the last step to MEM
end
```

In at least one embodiment, the calculation for the capacity loss, capacity_loss, of a merged segment pair 1008 may be calculated according to:

$$\text{capacity\_loss} = \text{absolute}(\text{Bit-Loading}(A(n)) - \text{Bit-Loading}(A(n+1))) * (\text{length of the segment with higher bit-loading}) \quad \text{(Eq. 10)}$$

In an alternative embodiment, segmentation reduction process 1000 may be performed by: (1) identifying existing segments 1004 in profile 1002, where a segment is defined as a set of contiguous subcarriers which have the same modulation order; (2) calculating the potential loss of combining each adjacent pair of segments 1004; (3) combining a pair of adjacent segments 1004 having the minimum capacity loss into merged segment 1008; and (4) iterating until the target number of segments 1004 is reached, i.e., profile 1002 contains the maximum target number of segments having different modulation orders.

In an embodiment, an exemplary PMA pseudocode for process 1000 may be represented as:

```
INIT: Calculate OFDM profile definitions based on a given PMA algorithm
INIT: Identify all existing segments/modulation order changes in the profile, store
        their starting index, ending index, and bit-loading value
INIT: Create a memorization mList with size N (N = numSegments − 1, number of
        adjacent segment pairs)
for each pair of adjacent segments (A(n), A(n + 1)) in the set of All adjacent
        segments do
        Calculate C(A(n), A(n + 1)) = capacity_loss(A(n), A(n + 1))
        Store   the set of values: Index(A(n)), bitloadingAfterMerge(which is
                min(A(n), A(n + 1))), combinedLength, capacityLoss to mList
end for
while number of segments > target number of segments do
        Sort mList by capacity loss in ascending order
        Find the pair A(n), A(n + 1) in mList with minimum capacity loss
        Combine segments A(n) and A(n + 1) and overwrite the combined segment
                to A(n) in the segment list
        Remove A(n + 1) from the segment list
        Remove the last element(the pair with minimum capacity loss) from the
                mList
        Subtract all pairs' indexes by 1 in the mList if the respective index indicator
                is larger than the index of A(n + 1)
        Remove all results stored in mList related to A(n + 1)
        Recalulate the capacity loss and segment information of combined segment
                A(n) when pairing with A(n − 1) and the new A(n + 1) if any of them
                exists
        Store the calculation result from the last step to the mList
```

According to the innovative principles of process 1000, the time complexity $O(n^2)$ of a single profile may be reduced, where n represents the number of initial segments in the profile. In one practical implementation of process 1000, the calculation for all channel profiles was accomplished in no more than a few milliseconds. Moreover, the processor is further enabled to generate deployable, lower resolution profile definitions for direct use on a D3.1 CMTS according to the specifications/needs of the particular CMTS, while still minimizing capacity loss during the profile conversion, as illustrated below with respect to FIG. 11, the resolution reduction that results from use of process 1000 is achieved without significant sacrifice of J-percentage capacity gain.

Figure 11:
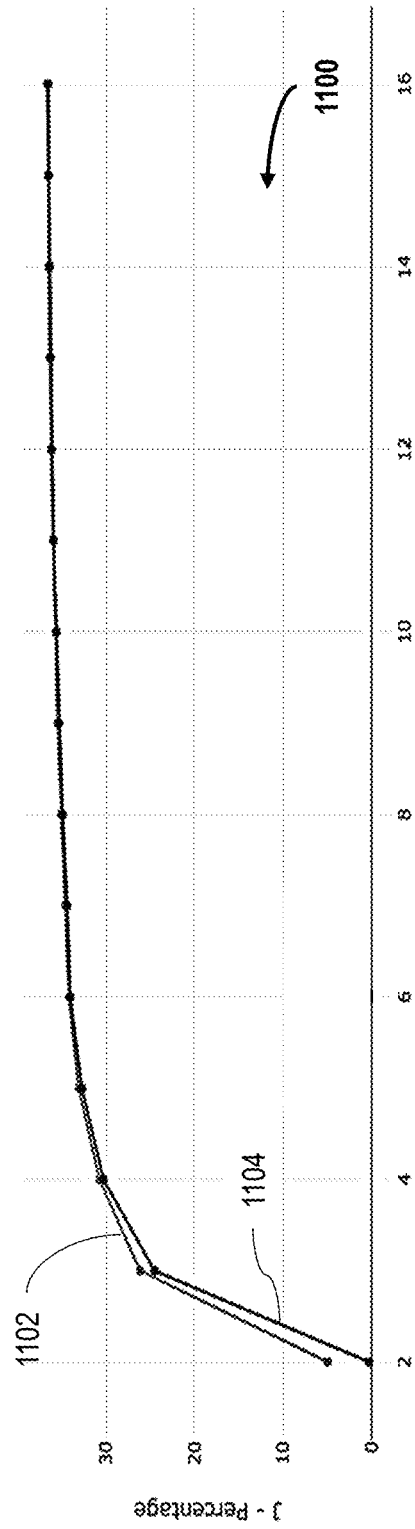
FIG. 11 is a graphical illustration plot comparing channel J-K correlations resulting from the segmentation process depicted in FIG. 10.

FIG. 11 is a graphical illustration plot 1100 comparing channel J-K correlations resulting from segmentation reduction process 1000, FIG. 10. In the embodiment depicted in FIG. 11, an optimal profile correlation plot 1102 illustrates the J-K correlations using a high resolution optimal profile of unlimited modulation order changes, and a reduced segmentation correlation plot 1104 illustrates the J-K correlations of a profile generated according to implementation of process 1000, and having a target limit of 20 segments for the lower resolution profile. As demonstrated in FIG. 11, correlation plot 1104 is only slightly reduced at lower values of J, K, and otherwise efficiently tracks very closely the results according to use of optimal profile.

Re-Use of LCD Profiles for Worst Case CM

As described above a D3.1 CMTS may be configured with multiple OFDM/OFDMA profiles which service different sets of CMs. However, the D3.1 CMTS may support only a limited number of profiles on a channel. Typically, the LCD of all supported profiles will be determined and then used as Profile A, and which is generally used for DOCSIS MAC Management Messages, and for getting CMs online. Profiles other than Profile A may each correspond to different sets of CMs. CMs having the same RxMER signature across the channel may be grouped together and use the same profile. However, the CMs having the worst RxMER values may end up defining many portions of Profile A, since these CMs represent the worst performing modems. That is, these CMs are the LCD among all of the CMs in operation with a particular CMTS.

The present systems and methods thus effectively gain an "extra" profile by freeing up the worst profile, or worst set of profiles (other than profile A), by demoting the CMs in the worst case groups to simply use profile A for data. By demoting the worst case CMs in this manner, the profile that would otherwise be used by the worst case CMs is freed for use by the other CMs. Accordingly, these other, better-performing CMs may then be grouped more closely to their respective MER signatures, thereby increasing the overall network throughput.

In other words, because D3.1 enables the creation of multiple profiles, the Profile A may be considered to always be the LCD of all of the created profiles. In this embodiment, Profile A is advantageously utilized for not only MAC Management Messages, but now also as the LCD for data of the worst CMs. The profile of the worst-performing CMs may then be opened for use by other CMs in the network. In an embodiment, the determination of which CMs are "worst" may be according to a calculation of MER loss, and weighted by the number of CMs belonging to the groups selected as being worst. The demotion of CMs to the LCD of Profile A though, does not degrade the performance of the CMs determined to be worst.

In an exemplary embodiment, the determination of worst case profiles, and subsequent demotion thereof to Profile A, is performed as a complementary subprocess of one or more of the PMA profile selection algorithms described above. The determination of the worst profile may be made in a manner similar to the profile selection criteria described above (e.g., using MER/weighted MER values), and the demotion to Profile A may be executed in a fashion similar to the profile combination processes described above with respect to FIGS. 8 and 9, with Profile A being the combination profile (e.g., similar to a reduction iteration) for MAC Management Messages and worst CM data. In an exemplary embodiment, the determination and demotion operations may be performed as part of a bit loading reduction algorithm.

Figure 12:
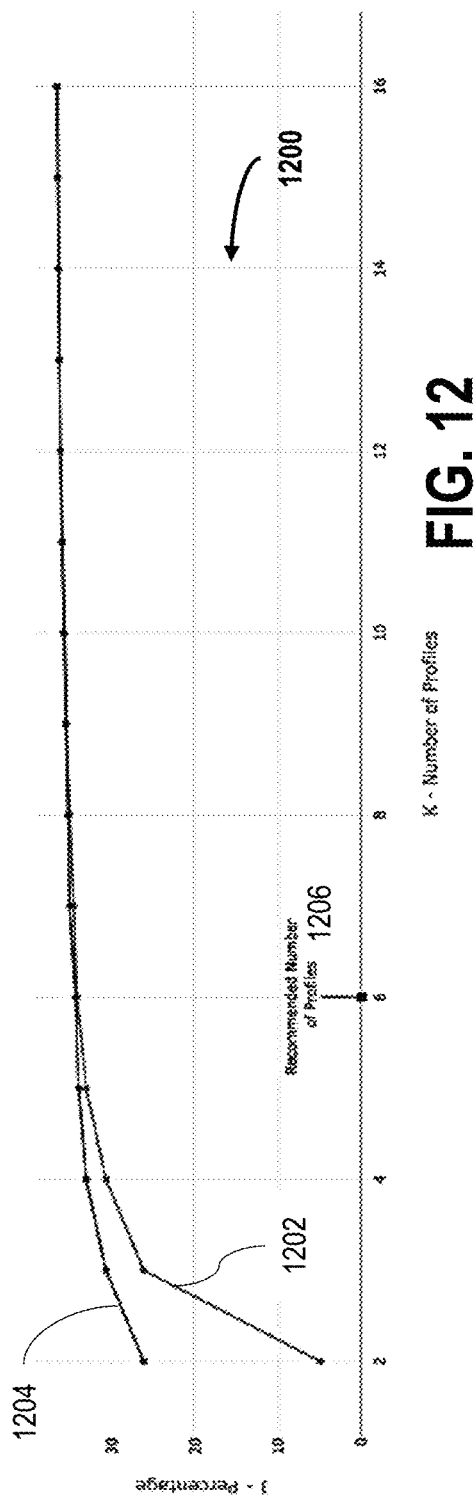
FIG. 12 is a graphical illustration plot comparing channel J-K correlations resulting from application of a bit loading reduction algorithm.

FIG. 12 is a graphical illustration plot 1200 comparing channel J-K correlations resulting from application of a bit loading reduction algorithm according to the present embodiments. More particularly, in the embodiment depicted in FIG. 12, an initial profile correlation plot 1202 illustrates the J-K correlations of a number of profiles without application of the present bit loading reduction algorithm, and a bit-reduced correlation plot 1204 illustrates the J-K correlations of the same number of profiles after application of the present bit loading reduction algorithm. As demonstrated in FIG. 12, for a CMTS supporting a recommended number 1206 of profiles (6 profiles or greater, in this example), plots 1202 and 1204 are substantially the same above the recommended number. However, many CMTS implementations only support 3-5 different profiles, and initial profile correlation plot 1202 illustrates how the J-percentage drops precipitously as the number of supported profiles is reduced to below the recommended number 1206. In contrast, using the present bit loading reduction algorithm, bit-reduced correlation plot 1204 illustrates that the J-percentage will substantially increase to values close to that of recommended number 1206 and above, even for a CMTS supporting relatively few profiles.

Figure 13A:
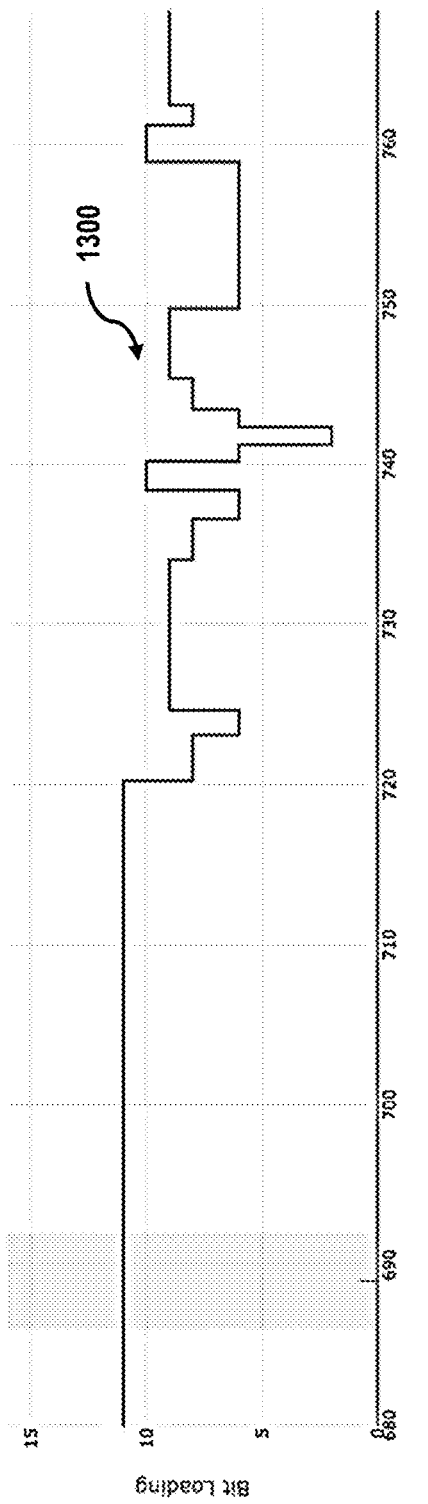
FIG. 13A is a graphical illustration of a high resolution profile plot.

FIG. 13A is a graphical illustration of a high resolution profile plot 1300. FIG. 13B is a graphical illustration of a lower resolution profile plot 1302. FIG. 13C is a graphical illustration superimposing high resolution plot 1300, FIG. 13A, with low resolution plot 1302, FIG. 13B. As best seen in FIG. 13C, a reduction in bit loading is less likely to capture as many segments of high resolution plot 1300, as compared with lower resolution plot 1302.

Figure 14:
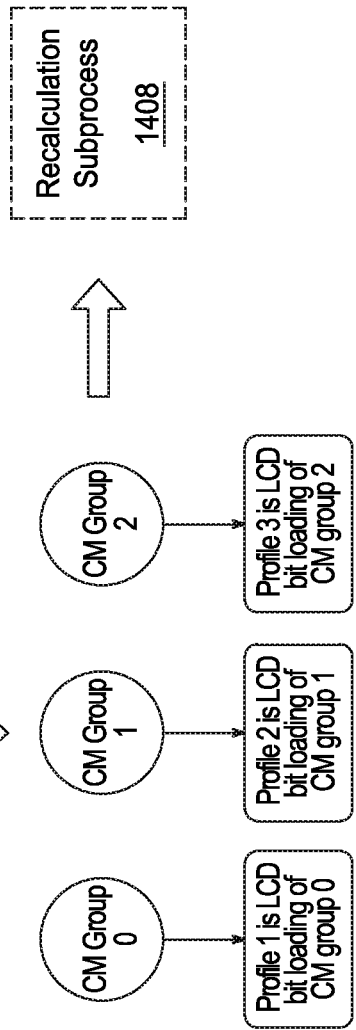
FIG. 14 illustrates an exemplary group iteration visualization that implements a bit loading reduction algorithm subprocess.

FIG. 14 illustrates an exemplary group iteration visualization 1400 that implements a bit loading reduction subprocess 1402. In an exemplary embodiment, visualization 1400 is substantially similar to visualization 900, FIG. 9, with respect to implementation of PMA optimization through reduction of CM Groups/profiles from respective group sets 1404 over successive iterations (e.g., PCA/brute force reduction operations using a memorization matrix), until reaching a target set 1404(*m*) of CM groups at a final Iteration m. Visualization 1400 differs from visualization 900 though, in that after reaching target set 1404(*m*), bit loading reduction subprocess 1402 is performed on target set 1404(*m*) to determine if the bit loading for a CM Group in target set 1404(*m*) may be demoted to Profile A by reducing the bit loading of that CM group as a "worst" profile, and thus combining that CM group with Profile A.

In an embodiment, an exemplary PMA pseudocode for subprocess 1402 may be represented according to:

```
If num_groups = = target_num_profiles + 1:
    overall_LCD = Lowest Common Denominator of all CM bit loadings
    determine the CM group having MIN loss when lowering the CM
        group_LCD
            to the overall_LCD by evaluating:
    Loss = (sum(overall_LCD) – sum(CM_group_LCD)) *          (Eq. 10)
    num_CMs_in_Group
        Calculate J value after lowering the profile bit loading for
        determined CM
            group to overall_LCD (profile_A) using:
```

$$J_{P,A} = \frac{1}{K_A * \sum_{\forall x \in P} \frac{\Phi_x}{K_x}} \quad \text{(Eq. 11)}$$

```
    Store the J value as J_reduced
    Store all CM group LCDs as profiles with CM MAC list as
    PROFILE_reduced
    Remove the profile of the CM group that has the smallest calculated
        Loss
    Continue to reduce the number of CM groups by 1 to reach the
        desired number
```

Upon completion of bit loading reduction subprocess 1402, a bit loading reduced CM Group set 1406 is calculated to have one fewer CM Group than target set 1404($m$). In an embodiment, once bit loading reduced CM Group set 1406 is calculated, an additional recalculation operation 1408 may be performed to compare the J-value of final target set 1404($m$) with the J-value of reduced CM Group set 1406. In an embodiment, an exemplary PMA pseudocode for recalculation operation 1408 may be represented according to:

```
Calculate J value of the final result as J_normal
if J_reduced > J_normal:
    Use PROFILE_reduced
    The CM group not on any profile other than PROFILE_A will use
        PROFILE_A to transmit data
else:
    Create profiles based on the CM groups at this step as
    PROFILE_normal
    Use PROFILE_normal
```

Thus, although visualization 1400 is capable of implementing all or some of visualization 900 to reduce CM Groups, visualization 1400 is configured to perform additional subprocesses and operations across all profiles to reuse the LCD profile the worst case CMs/CM Groups in the case where the J-value of bit loading reduced set 1406 is greater than the J-value of final target set 1404($m$), such as due to the inclusion of a "worst" CM/CM Group in final target set 1404($m$). Therefore, the principles of capacity loss that are determined in this embodiment are similar to those described above, but the calculation is not identical. Nevertheless, in an embodiment, the additional calculations, operations, and subprocesses of visualization 1400 may be fully implemented, in a complementary fashion, in conjunction with one or more of the PMA embodiments described above.

Through implementation of the systems and methods described with respect to FIG. 14, an additional profile is freed for use by other CMs (i.e., better performing), which other CMs may then be grouped closer to their respective MER signatures. By these techniques, an additional profile is effectively generated, and the overall network throughput is thereby advantageously increased.

PMA Profile Creation and Assignment Optimization

The systems and methods described herein provide innovative techniques for profile creation, and particularly with respect to the D3.1 paradigm. The creation of these profiles may be more effectively performed and optimally assigned according to one or more of the following supplemental optimization embodiments that may be implemented with respect to the bit loading or MER data of the respective profiles.

Figure 15A:
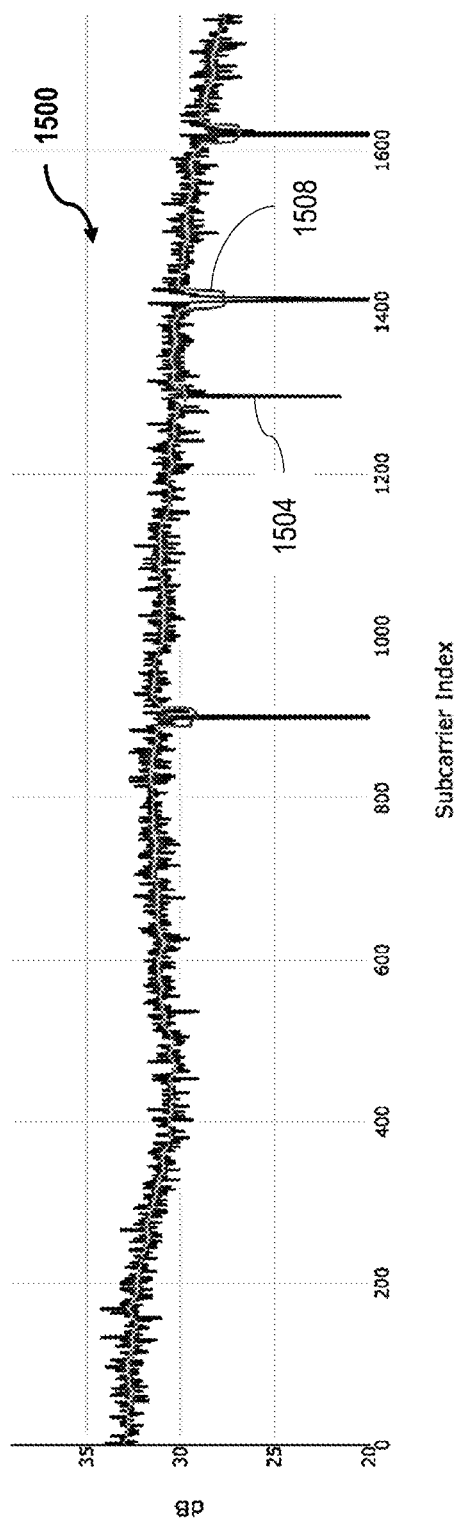
FIGS. 15A-B are graphical illustration plots depicting exemplary channel smoothing processes.
Figure 15B:
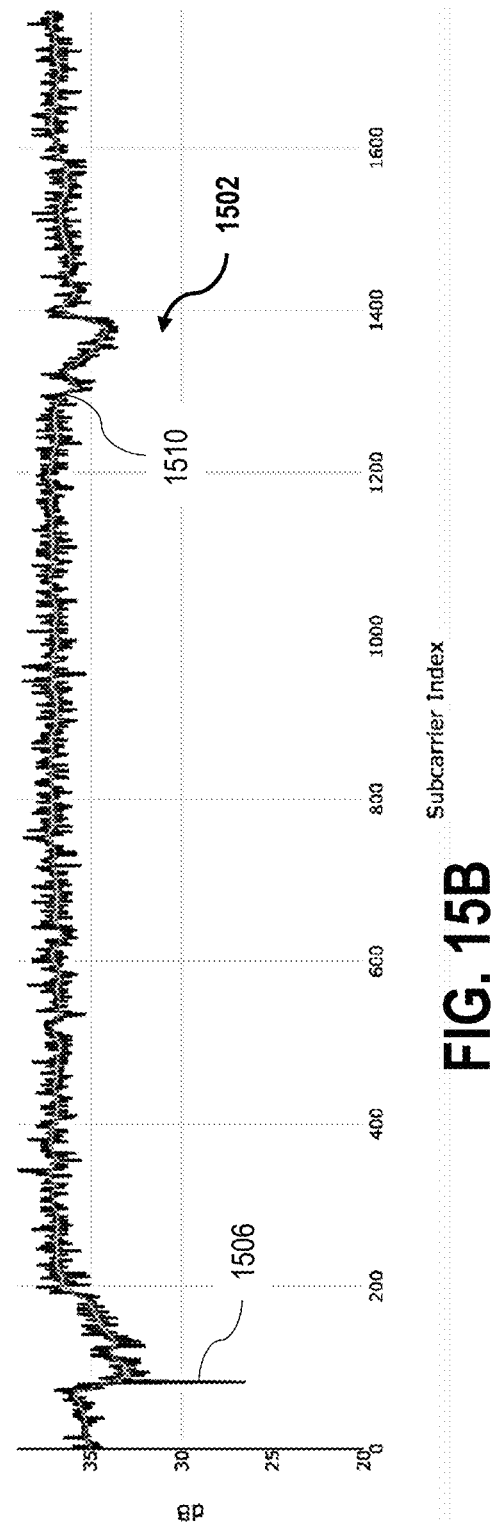

FIGS. 15A-B are graphical illustration plots 1500, 1502 depicting exemplary channel smoothing processes. As depicted in FIGS. 15A-B, plots 1500, 1502 respectively represent RxMER data (in dB) from every CM on the channel of the subcarrier index. The RxMER data appears generally noisy, and plots 1500, 1502 include several signal spikes 1504, 1506, respectively, exhibiting significant departures from the transmitted power of the majority of subcarriers.

Accordingly, in the exemplary embodiment, a pre-filter is applied to the RxMER data of plots 1500, 1502, to generate respective smoothing subplots 1508, 1510. As can be seen in FIGS. 15A-B, smoothing subplots 1508, 1510 are significantly flatter than the raw RxMER data, and thereby enable significantly improved stability for the respective clustering algorithms over time. From the significantly flatter shapes to smoothing subplots 1508, 1510, number of CMs that must be classified into different profiles is significantly reduced.

Accordingly, through implementation of respective smoothing processes, profiles having a significantly flatter definition across the OFDM/A channel may be created. The smoothing processes further enable the processor to effectively ignore anomalies in the RxMER values of particular sets of contiguous subcarriers which may deviate from the majority of the neighboring subcarriers that are nearest thereto. For example, in smoothing subplots 1508, 1510, the respective data spikes 1504, 1506 are significantly removed and/or mitigated. Through the smoothing processes of its this exemplary embodiment, data pre-filtering reduces the noise in the RxMER signal data, in thereby enables the creation of profiles that do not change modulation order from profile to profile. The capability to ignore small anomalies in the RxMER data is further useful with respect to the D3.1 LDPC FEC specification, in that implementation of these smoothing/filtering processes render the system capable of overcoming bit errors on those subcarriers within the OFDM/OFDMA channel.

Accordingly, the embodiments of FIGS. 15A-B may be implemented separately from, or in combination with, one or more of the PMA and profile creation algorithms described above, which function to create profiles and cluster CMs. By these processes of filtering noisy RxMER data, systems and methods employing one or more of the embodiments described above may effectively ignore anomalies smaller than the particular widths of the respective subcarriers. Through these data-filtering and anomaly-discarding operations, the present systems and methods are able to create significantly more practical profiles for immediate use.

Figure 16:
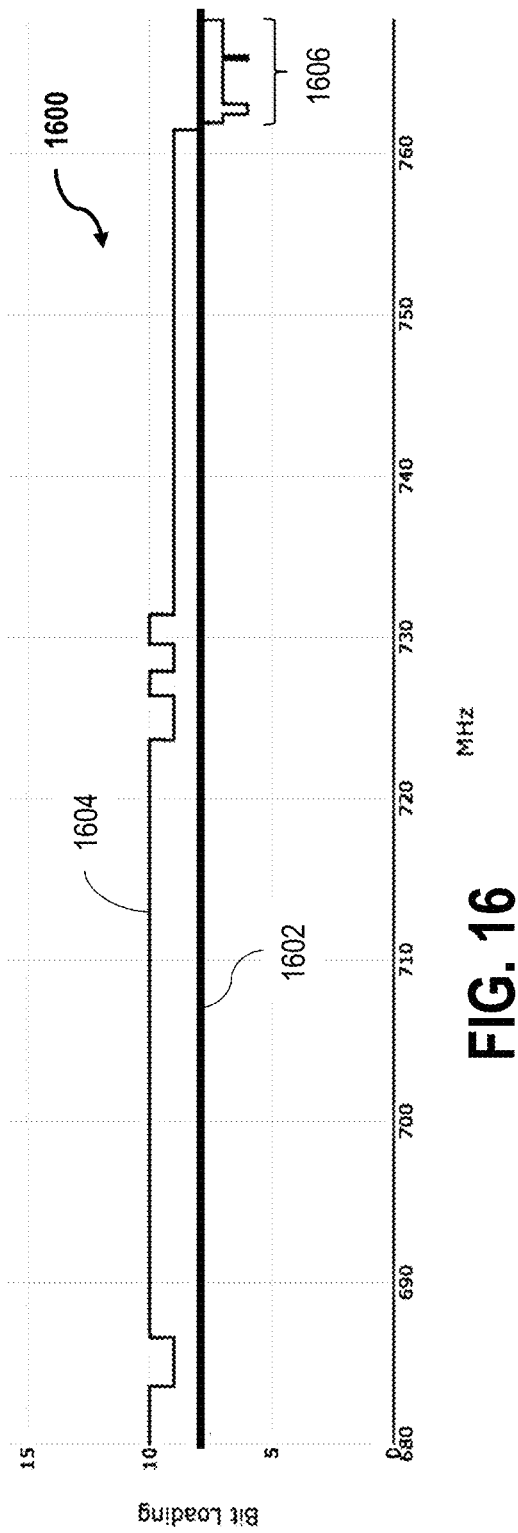
FIG. 16 is a graphical illustration plot of a flat profile implemented with respect to a bit loading profile.

FIG. 16 is a graphical illustration plot 1600 of a flat profile 1602 implemented with respect to a bit loading profile 1604. In an exemplary embodiment, plot 1600 represents an implementation of a flat profile assignment process with respect to one or more of the PMA embodiments described above. As illustrated in FIG. 16, flat profile 1602 is implemented at a constant bit loading value below a substantial majority of the spectrum of bit loading profile 1604.

An efficient flat profile assignment process is valuable to operators that do not, or cannot, create tailor-made profiles for their particular operations. Some such operators are beginning to experiment with the concept of flat profiles instead of PMA. Accordingly, the embodiment of FIG. 16 provides a relatively simple assignment solution for enabling operators to quickly assign CMs/modems to selected flat profiles that are significantly more optimal choices than the conventional technique of merely selecting the lowest modulation order possible on any subcarrier on the OFDM channel.

Accordingly, in the absence of a PMA capable of creating tailor-made profiles, in an exemplary embodiment, an effective process for assigning CMs to flat profiles may be accomplished by: (i) translating the RxMER values per subcarrier into modulation orders; (ii) arranging all of the translated modulation orders per subcarrier in descending order; (iii) determining the bottom percentile of the arranged modulation orders (e.g., lowest 1%, 2%, or 5%, etc., as desired); and (iv) assigning a flat profile, at the constant value at or immediately above the modulation order corresponding to the desired bottom per symbol value, to one or more CMs. That is, the value of the modulation order at the bottom percentile becomes the flat profile to which a CM is assigned. As illustrated in FIG. 16, flat profile 1602 is assigned at a bit loading value corresponding to a modulation order that captures the substantial majority of bit loading profile 1604, except for a small portion 1606 representing the bottom percentile.

Figure 17:
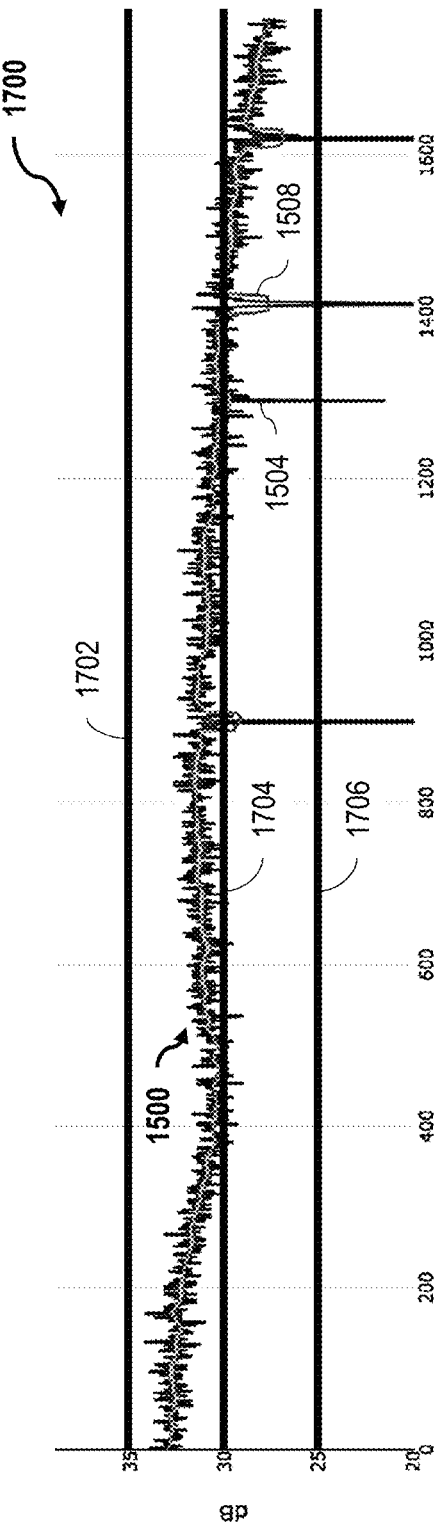
FIG. 17 is a graphical illustration plot of flat profiles implemented with respect to a channel subcarrier index.

FIG. 17 is a graphical illustration plot 1700 of flat profiles 1702, 1704, 1706 implemented with respect to a channel subcarrier index. In an exemplary embodiment, flat profiles 1702 may be selected and assigned in a manner similar to the flat profile assignment process described with respect to FIG. 16, except that, in the example depicted in FIG. 17, the flat profile assignment process is determined with respect to RxMER data instead of bit loading profiles.

In the example depicted in FIG. 17, first, second, and third flat profiles 1702, 1704, 1706 represent MER values of 35 dB, 30 dB, and 25 dB, respectively, and are superimposed with respect to plot 1500, FIG. 15. Accordingly, it may be seen from this example that first profile 1702 occurs at a value above the entirety (i.e., 100%) of plot 1500, rendering first profile 1702 undesirable as a flat profile for the signal of plot 1500. In contrast, second flat profile 1704 falls below a substantial majority of plot 1500, and an even larger majority of smoothing subplot 1508. Thus, second flat profile 1704 may be an effective selection in the case where a smoothing process is used to pre-filter the RxMER data, or even in the case where a smoothing process is not used, but the desired bottom percentile of data is larger (e.g., 5% vs 2%).

Similarly, third flat profile 1706 is illustrated to occur at a value that falls below all of smoothing subplot 1508, and all but a very small portion of the raw RxMER data of plot 1500 including only data spikes 1504. Thus, third flat profile 1706 may be selected in the case where a smoothing process is not used or available, and the desired bottom percentile of the flat profile process is very small (e.g., 1% or lower). Accordingly, the embodiments described with respect to FIGS. 16 and 17 demonstrate that profile flattening techniques and flat profile assignment processes provide effective standalone solutions, or supplemental improvements to the above PMA techniques.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A transmission system for transmitting a plurality of active subcarriers over a channel, the plurality of active subcarriers including a first profile having a first number of carrier subgroup segments corresponding to particular modulation order, respectively, the system comprising:
  a modem termination system (MTS) configured to support a second number of modulation profiles fewer than the first number;
  a plurality of modems in operable communication with the modem termination system; and
  a profile management unit configured to (i) identify all carrier subgroup segments in the first profile, (ii) calculate a capacity loss value for each possible pairing of a carrier subgroup segment with an immediately adjacent segment in the first profile, the immediately adjacent segment having a different modulation order than the carrier subgroup segment with which the immediately adjacent segment is paired, (iii) determine which adjacent segment pair has a minimum capacity loss among the possible carrier subgroup segment pairings in the first profile, (iv) merging the adjacent segment pair having the minimum capacity loss, (v) generating a second profile for the plurality of active subcarriers, wherein the second profile includes one fewer segment than the first profile.

2. The transmission system of claim 1, wherein the MTS comprises the profile management unit.

3. The transmission system of claim 1, wherein the MTS comprises at least one of a cable modem termination system, an optical network terminal, an optical line terminal, a network termination unit, and a satellite termination unit.

4. The transmission system of claim 1, wherein the plurality of modems comprise one or more of a cable modem, an optical network unit, a digital subscriber line unit/modem, and a satellite modem.

5. The transmission system of claim 1, wherein the second profile has a lower resolution than the first profile.

6. The transmission system of claim 1, wherein the first and second profiles correspond to an orthogonal frequency-division multiplexing or an orthogonal frequency-division multiple access profile definition.

7. The transmission system of claim 1, further comprising a step of recalculating, for each possible pairing of the merged adjacent segment pair with a remaining adjacent segment pair, a merged capacity loss value.

8. The transmission system of claim 7, wherein the profile management unit is further configured to perform multiple iterations until the second profile is reduced to a target number of segments.

9. The transmission system of claim 8, wherein the profile management unit further comprises a memory, and is further configured to store the results of each of the multiple iterations in the memory.

10. The transmission system of claim 9, wherein the results of each of the multiple iterations are stored within a memorization list configured for sequential updating to remove stored values from segments merged in a previous iteration.

\* \* \* \* \*